United States Patent
Komori et al.

(10) Patent No.: US 9,554,029 B2
(45) Date of Patent: Jan. 24, 2017

(54) IMAGING APPARATUS AND FOCUS CONTROL METHOD

(71) Applicant: SONY CORPORATION, Tokyo (JP)

(72) Inventors: Kenji Komori, Saitama (JP); Norihiko Akamatsu, Tokyo (JP); Akifumi Mizukami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 14/414,165

(22) PCT Filed: Jul. 9, 2013

(86) PCT No.: PCT/JP2013/004227
§ 371 (c)(1),
(2) Date: Jan. 12, 2015

(87) PCT Pub. No.: WO2014/041733
PCT Pub. Date: Mar. 20, 2014

(65) Prior Publication Data
US 2015/0181106 A1    Jun. 25, 2015

(30) Foreign Application Priority Data
Sep. 11, 2012 (JP) ................. 2012-199533

(51) Int. Cl.
H04N 5/232 (2006.01)
G02B 7/34 (2006.01)
G03B 13/36 (2006.01)
H04N 5/369 (2011.01)

(52) U.S. Cl.
CPC ............ *H04N 5/23212* (2013.01); *G02B 7/34* (2013.01); *G03B 13/36* (2013.01); *H04N 5/3696* (2013.01)

(58) Field of Classification Search
None
See application file for complete search history.

(56) References Cited

U.S. PATENT DOCUMENTS

| | | | | |
|---|---|---|---|---|
| 6,453,124 B2* | 9/2002 | Morimoto | ............... | G02B 7/28 348/346 |
| 8,711,274 B2* | 4/2014 | Takanashi | .............. | G02B 7/282 348/349 |
| 8,717,490 B2* | 5/2014 | Imamura | ............ | H04N 5/23212 348/345 |
| 8,724,011 B2* | 5/2014 | Nakamoto | ......... | H04N 5/23212 348/345 |
| 8,730,380 B2* | 5/2014 | Uchida | .................. | G03B 13/36 348/345 |

(Continued)

*Primary Examiner* — Michael Osinski
(74) *Attorney, Agent, or Firm* — Chip Law Group

(57) ABSTRACT

There is provided an imaging apparatus including a first focus detection unit that has a plurality of first focus detection areas in a photographed screen, and detects a first defocusing amount in the first focus detection areas, a second focus detection unit that has a plurality of second focus detection areas in a photographed screen, and detects a second defocusing amount in the second focus detection areas, a defocusing amount selection unit that selects which of the first defocusing amount detected by the first focus detection unit and the second defocusing amount detected by the second focus detection unit is used, and a focus control unit that performs focus control by moving a focus lens on the basis of the defocusing amount selected by the defocusing amount selection unit.

16 Claims, 21 Drawing Sheets

(56) References Cited

U.S. PATENT DOCUMENTS

| | | | | |
|---|---|---|---|---|
| 8,861,950 B2* | 10/2014 | Masuyama | G03B 7/08 348/362 |
| 9,083,881 B2* | 7/2015 | Hamada | H04N 5/23209 |
| 9,215,389 B2* | 12/2015 | Usui | H04N 5/23212 |
| 9,219,856 B2* | 12/2015 | Akamatsu | G03B 13/36 |
| 2006/0165403 A1* | 7/2006 | Ito | G02B 7/285 396/123 |
| 2007/0065127 A1* | 3/2007 | Suda | G03B 17/00 396/52 |
| 2007/0122137 A1* | 5/2007 | Ohnishi | G03B 13/34 396/123 |
| 2007/0206940 A1* | 9/2007 | Kusaka | G03B 13/28 396/128 |
| 2007/0230937 A1* | 10/2007 | Ide | G02B 7/36 396/125 |
| 2008/0267601 A1* | 10/2008 | Kobayashi | G03B 13/32 396/91 |
| 2009/0153666 A1* | 6/2009 | Takeuchi | G01S 3/7864 348/169 |
| 2010/0194967 A1* | 8/2010 | Amano | G02B 7/34 348/345 |
| 2011/0052169 A1* | 3/2011 | Arita | G03B 13/34 396/121 |
| 2011/0267532 A1* | 11/2011 | Sakurai | H04N 5/23212 348/345 |
| 2011/0310291 A1* | 12/2011 | Kato | H04N 5/3696 348/354 |
| 2012/0099006 A1* | 4/2012 | Matsuo | H04N 5/23212 348/241 |
| 2012/0162492 A1* | 6/2012 | Akamatsu | G03B 13/36 348/345 |
| 2012/0262623 A1* | 10/2012 | Taguchi | H04N 5/23212 348/349 |
| 2012/0281130 A1* | 11/2012 | Kudo | G02B 7/287 348/333.08 |
| 2012/0301125 A1* | 11/2012 | Ashida | G03B 13/36 396/95 |
| 2013/0250157 A1* | 9/2013 | Yoshida | H04N 5/23212 348/333.01 |
| 2013/0265482 A1* | 10/2013 | Funamoto | H04N 5/23212 348/349 |
| 2013/0265484 A1* | 10/2013 | Hasegawa | H04N 5/23212 348/349 |
| 2013/0335614 A1* | 12/2013 | Ichimiya | G02B 7/346 348/333.11 |
| 2014/0071318 A1* | 3/2014 | Akamatsu | H04N 5/23212 348/294 |
| 2015/0130987 A1* | 5/2015 | Nakagawa | H04N 5/23212 348/349 |
| 2015/0163440 A1* | 6/2015 | Furumochi | H04N 9/735 348/223.1 |
| 2015/0256738 A1* | 9/2015 | Inoue | G02B 7/34 348/362 |
| 2015/0286112 A1* | 10/2015 | Inoue | G02B 7/36 348/357 |
| 2015/0296125 A1* | 10/2015 | Kusaka | G02B 7/34 348/349 |

* cited by examiner

FIG. 3

|   |   |   |   |   |   | 1030 |   | 1031 |   |   |   |   |
|---|---|---|---|---|---|---|---|---|---|---|---|---|
| R | G | R | G | R | G | R | G | R | G | R | G | R |
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |
| R | G | R | G | R | G | R | G | R | G | R | G | R |
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |
| R | G | R | G | R | G | R | G | R | G | R | G | R |
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |

FIG. 4

PHOTOGRAPHED SCREEN

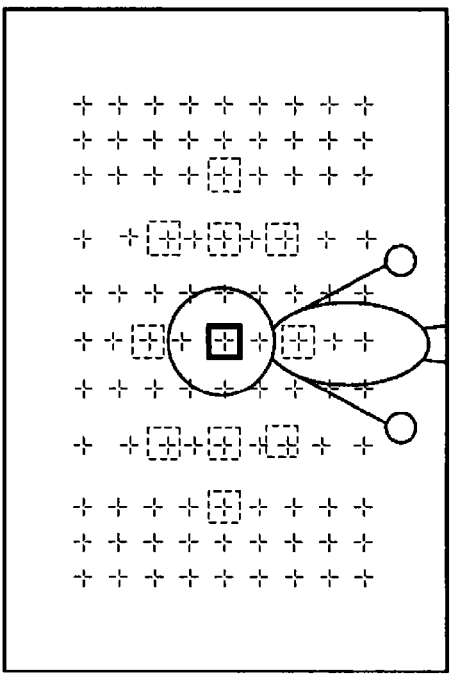
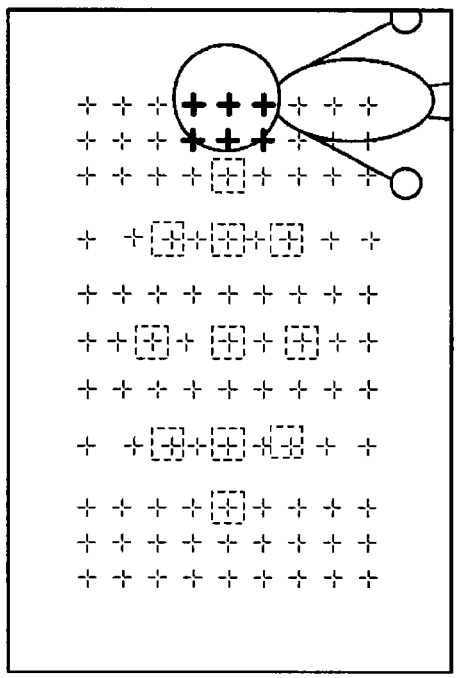
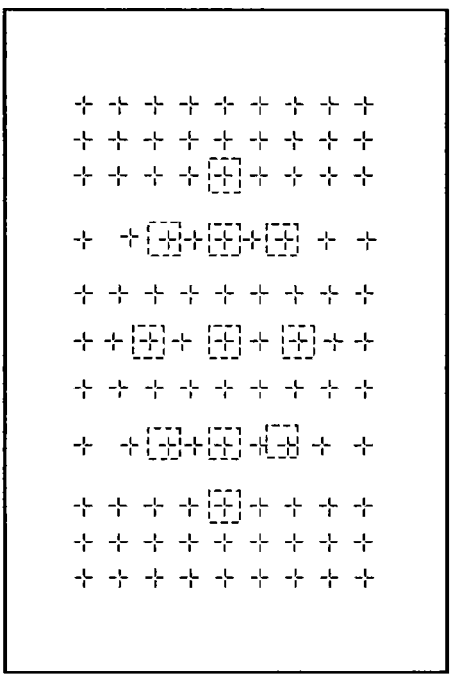
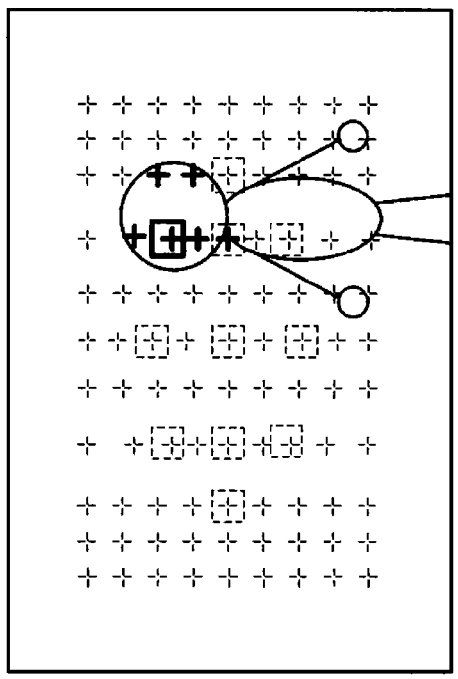
FIG. 7

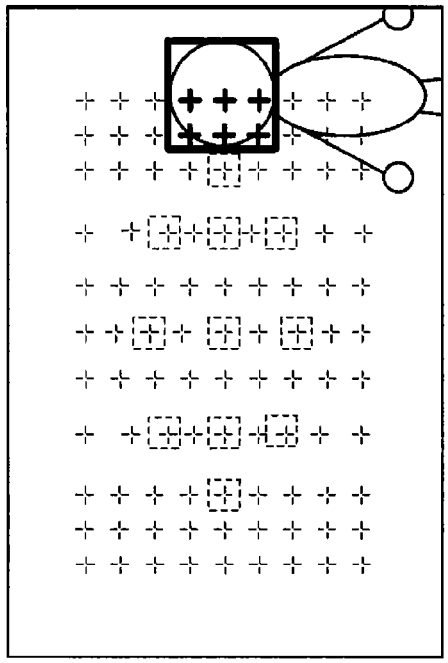
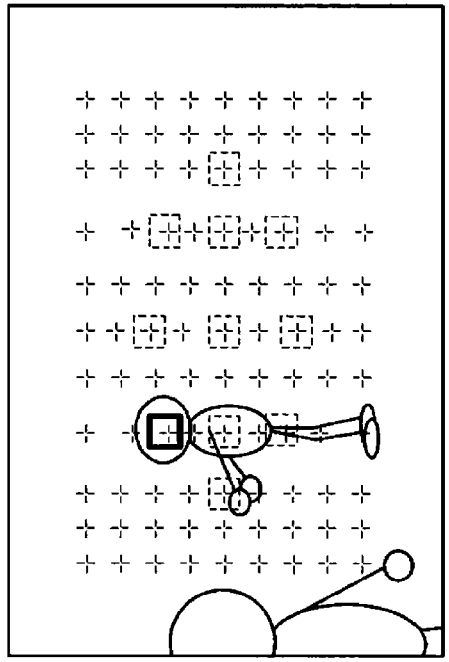
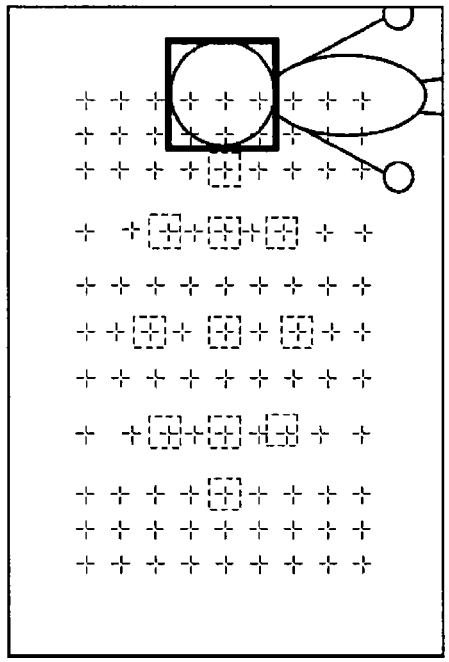
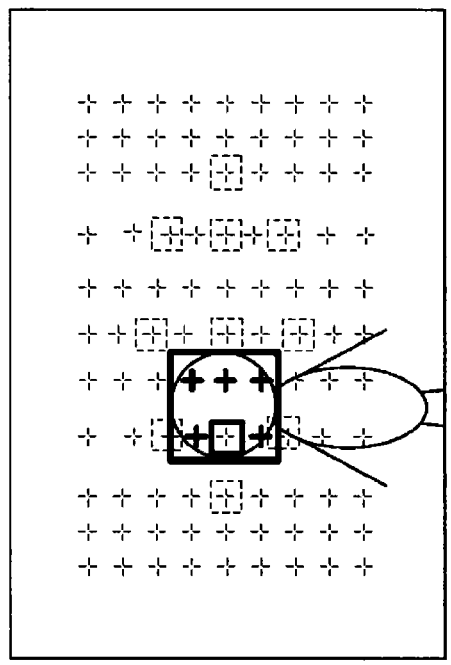
FIG. 19

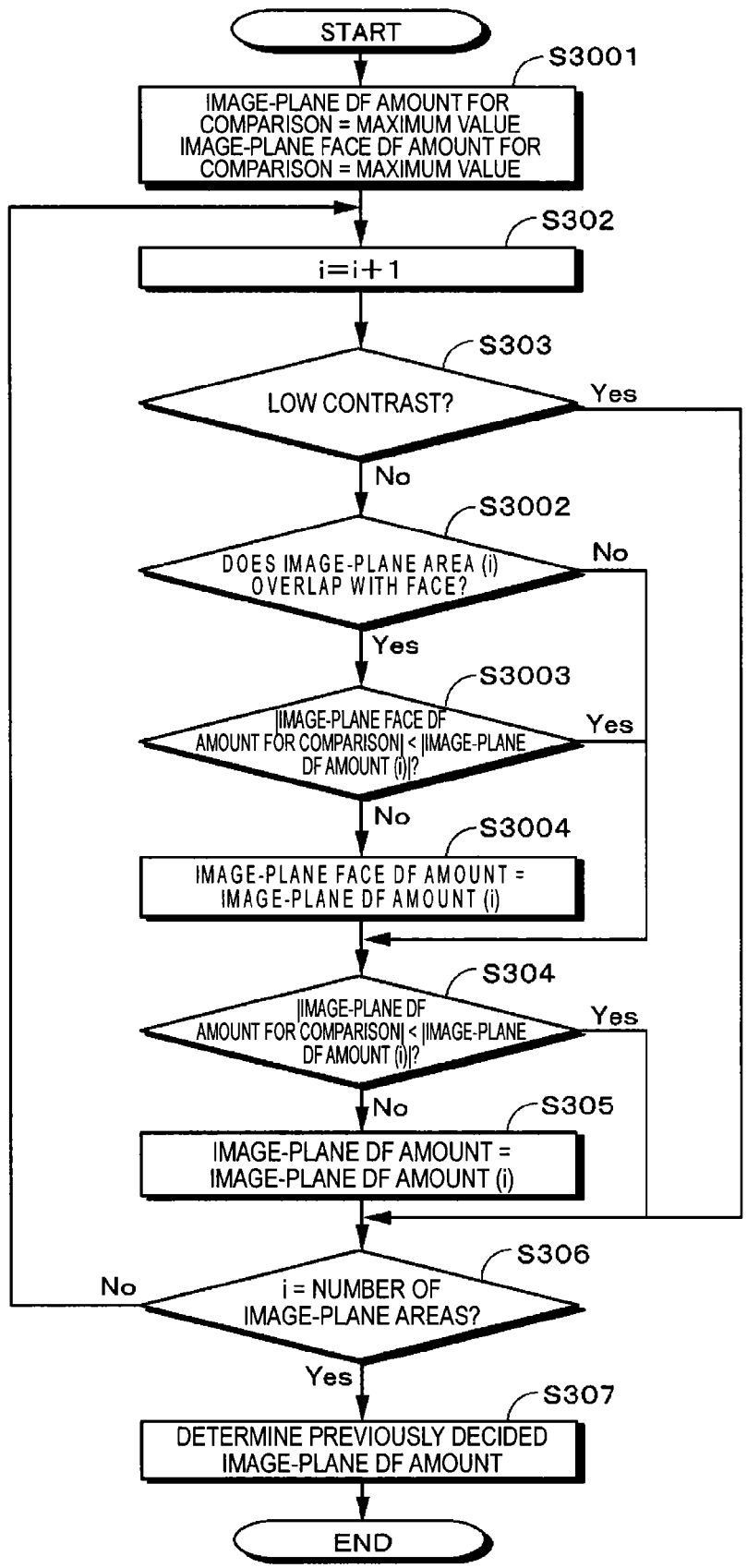

IMAGING APPARATUS AND FOCUS CONTROL METHOD

TECHNICAL FIELD

The present technology relates to an imaging apparatus and a focus control method.

BACKGROUND ART

In single lens reflex cameras of the related art, a so-called dedicated phase difference sensor is mounted to realize fast autofocus. On the other hand, compact cameras, mirrorless cameras, and the like generally employ a contrast detection autofocus (hereinafter referred to as AF) system. In addition, in order to realize fast AF in such cameras, a method of embedding an image sensor for phase difference detection in another image sensor has been proposed (Patent Literature 1).

Furthermore, a method of mounting both a dedicated phase difference detecting module and a phase difference detecting image sensor has also been proposed in order to obtain advantages of both sensors using the above-described technique (Patent Literature 2).

CITATION LIST

Patent Literature

Patent Literature 1: JP 2000-156823A

SUMMARY OF INVENTION

Technical Problem

AF areas that support as wide regions as possible are desired for such cameras to allow for AF tracing of subjects moving up and down, and sideways. Accordingly, if both of a dedicated phase difference detecting module and a phase difference detecting image sensor are mounted to support a wide range of areas, the difficulty is expected in focusing on targeted subjects through wide detection. It is also conceivable that the entrance of an unintended subject into the frame easily shifts the focus to the subject.

In view of these problems, the present technology has been devised. The purpose of the present technology is to provide an imaging apparatus and a focus control method that can keep tracing a target subject.

Solution to Problem

To solve the above-described problems, the first technology provides an imaging apparatus including a first focus detection unit that has a plurality of first focus detection areas in a photographed screen, and detects a first defocusing amount in the first focus detection areas, a second focus detection unit that has a plurality of second focus detection areas in a photographed screen, and detects a second defocusing amount in the second focus detection areas, a defocusing amount selection unit that selects which of the first defocusing amount detected by the first focus detection unit and the second defocusing amount detected by the second focus detection unit is used, and a focus control unit that performs focus control by moving a focus lens on the basis of the defocusing amount selected by the defocusing amount selection unit.

Furthermore, the second technology provides a focus control method including selecting which of a first defocusing amount and a second defocusing amount is used, the first defocusing amount being detected by a first focus detection unit that has a plurality of first focus detection areas in a photographed screen, the second defocusing amount being detected by a second focus detection unit that has a plurality of second focus detection areas in a photographed screen, and performing focus control by moving a focus lens on the basis of the selected defocusing amount.

Advantageous Effects of Invention

According to the present technology, it is possible to keep tracing a target subject when an imaging apparatus images an image.

BRIEF DESCRIPTION OF DRAWINGS

FIG. 3 is a diagram illustrating a configuration of an image sensor.

FIG. 4 is a diagram illustrating a disposition of image-plane AF areas and dedicated AF areas on a photographed screen.

FIGS. 7A, 7B, 7C, and 7D are diagrams for describing an overview of a process in the first embodiment.

FIGS. 19A, 19B, 19C, and 19D are diagrams for describing a second example of the overview of the process in the second embodiment.

FIG. 22 is a flowchart for describing an image-plane defocusing amount decision process in the second embodiment.

DESCRIPTION OF EMBODIMENTS

Hereinafter, embodiments of the present technology will be described with reference to the appended drawings. Note that the description will be provided in the following order.
<1. First Embodiment>
[1-1. Configuration of Imaging Apparatus]
[1-2. Overview of Process]
[1-3. Defocusing Amount Selection Process]
[1-4. Image-plane Defocusing Amount Decision Process]
[1-5. Image-plane Defocusing Amount Correction Process]
<2. Second Embodiment>
[2-1. Configuration of Imaging Apparatus]
[2-2. Overview of Process]
[2-3. Defocusing Amount Selection Process]
<3. Modified example>
<1. First Embodiment>
[1-1. Configuration of Imaging Apparatus]

Figure 1:
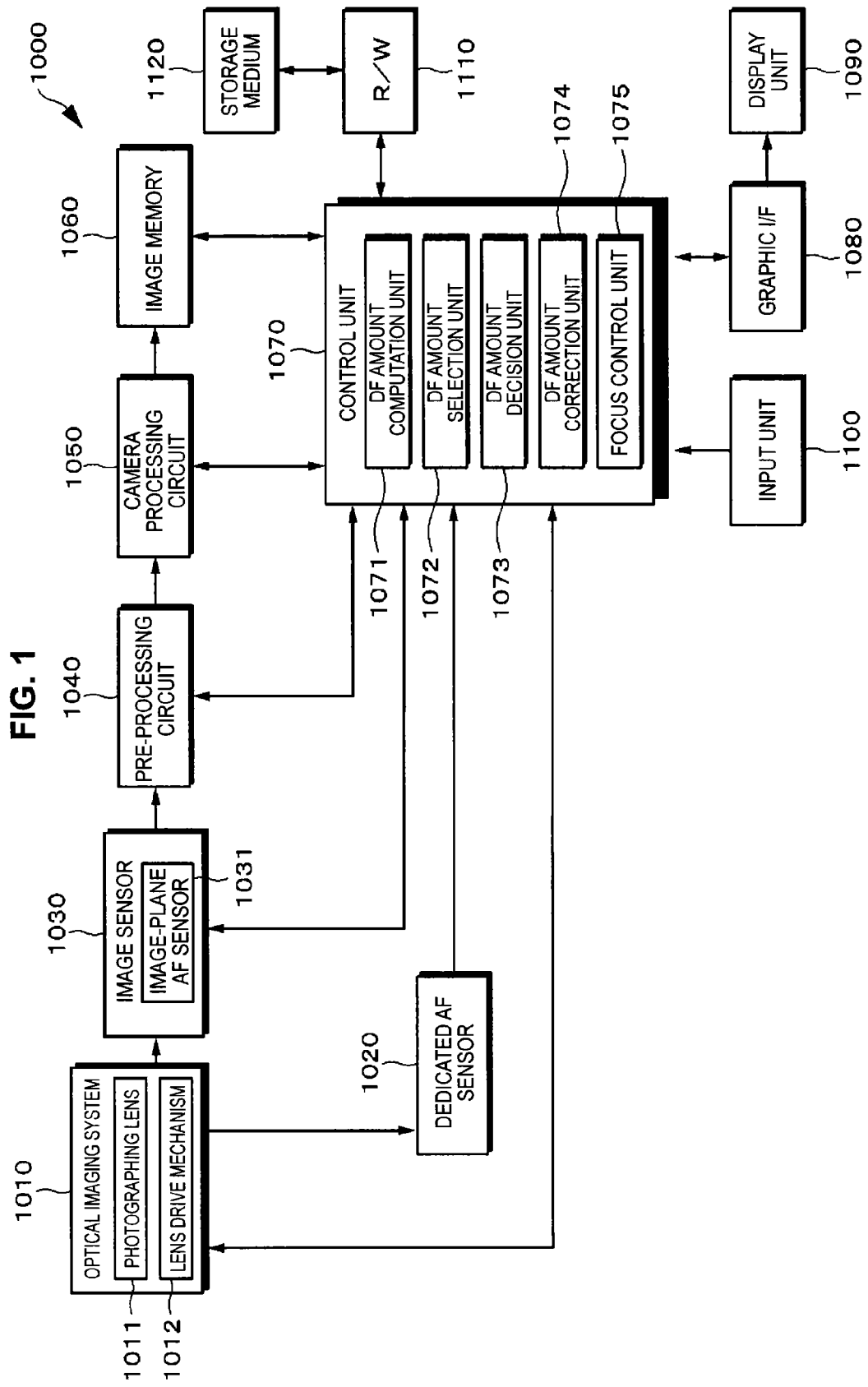
FIG. 1 is a block diagram illustrating a configuration of an imaging apparatus according to a first embodiment of the present technology.
Figure 2:
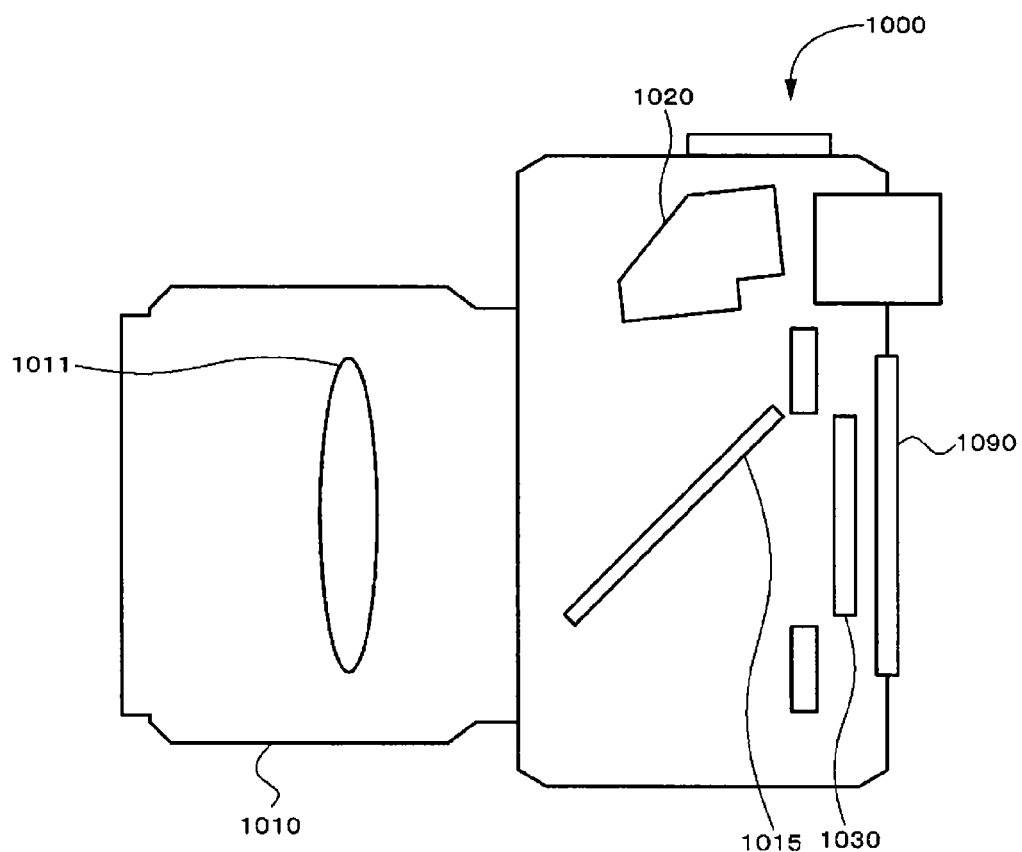
FIG. 2 is a schematic cross-sectional diagram illustrating a schematic configuration of an imaging apparatus.

The configuration of an imaging apparatus 1000 according to the present embodiment will be described. FIG. 1 is a diagram illustrating a block configuration of the imaging apparatus 1000. FIG. 2 is a schematic cross-sectional diagram illustrating a schematic configuration of the imaging apparatus 1000.

Figure 6:
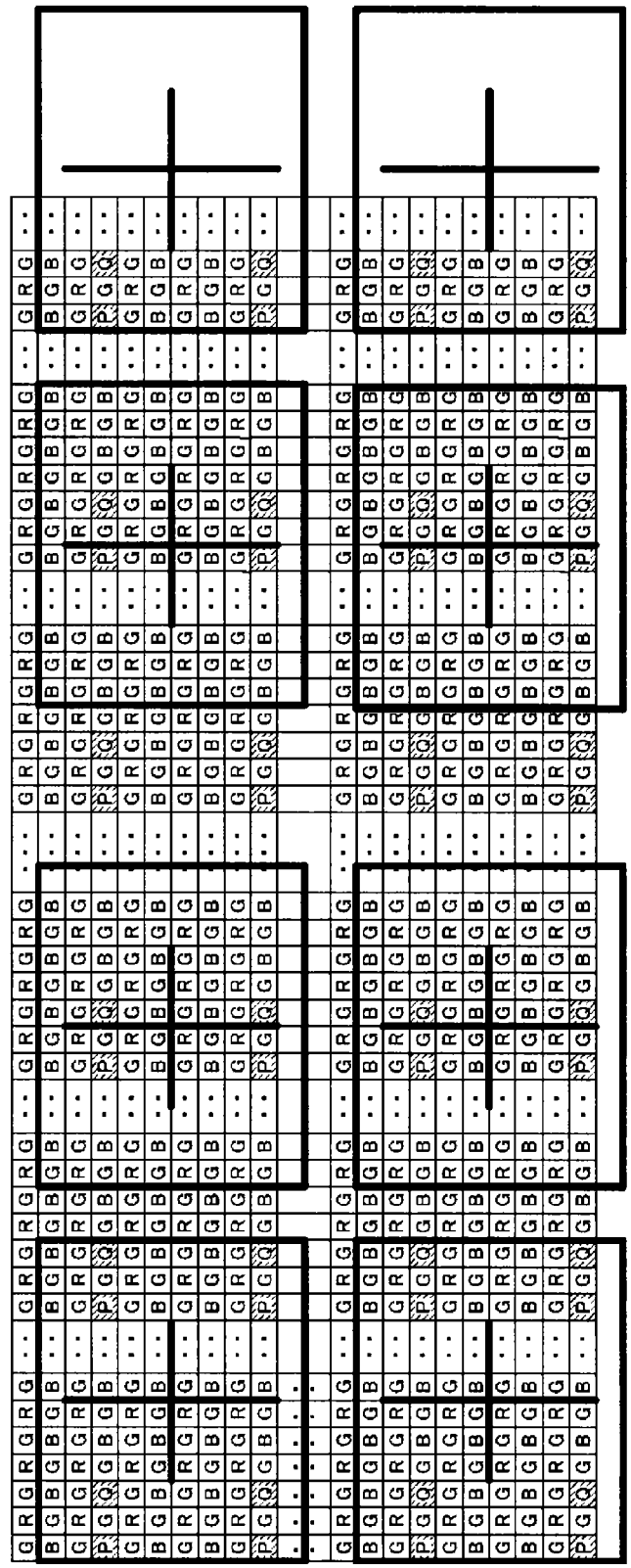
FIG. 6 is a diagram for describing another configuration of image-plane AF areas.

The imaging apparatus 1000 of FIG. 6 is configured to include the optical imaging system 1011, the dedicated AF sensor 1020, the image sensor 1030, the image-plane AF sensor 1031, a pre-processing circuit 1040, a camera processing circuit 1050, an image memory 1060, a control unit 1070, a graphic I/F (Interface) 1080, a display unit 1090, an input unit 1100, an R/W (reader and writer) 1110, and a storage medium 1120. The control unit functions as a defocusing amount computation unit 1071, a defocusing amount selection unit 1072, a defocusing amount decision unit 1073, a defocusing amount correction unit 1074, and a focus control unit 1075.

The optical imaging system 1011 is configured to include the photographing lens 1011 for collecting light from a subject on the image sensor 1030 (including a focus lens, a zoom lens, and the like), a lens drive mechanism 1012 that adjusts focus by moving the focus lens, a shutter mechanism, an iris mechanism, and the like. The system is driven based on a control signal from the control unit 1070 and the focus control unit 1075. The lens drive mechanism 1012 realizes an AF operation by moving the photographing lens 1011 in an optical axis direction by an amount corresponding to a defocusing amount supplied from the focus control unit 1075. A light image of a subject obtained through the optical imaging system 1011 is formed on the image sensor 1030 serving as an imaging device.

The dedicated AF sensor 1020 is a dedicated autofocus sensor of, for example, the phase difference detection AF system, the contrast detection AF system, or the like. Subject light collected by the photographing lens 1011 is reflected on the semi-transmissible mirror and incident on the dedicated AF sensor 1020. A focus detection signal detected by the dedicated AF sensor 1020 is supplied to the defocusing amount computation unit 1071. The dedicated AF sensor 1020 corresponds to a first focus detection unit according to the claims. Thus, a defocusing amount obtained from detection of focus by the dedicated AF sensor 1020 corresponds to a first defocusing amount according to the claims.

The image sensor 1030 has R (Red) pixels, G (Green) pixels, and B (Blue) pixels, which are normal imaging pixels, and phase difference detection pixels for detecting a phase difference focus. The pixels constituting the image sensor 1030 photoelectrically convert light incident from a subject into an amount of electric charge, and output a pixel signal. In addition, the image sensor 1030 finally outputs an imaging signal that includes the pixel signal to the pre-processing circuit 1040. As the image sensor 1030, a CCD (Charge Coupled Device), a CMOS (Complementary Metal Oxide Semiconductor), or the like is used. It should be noted that a detailed configuration of the image sensor 1030 will be described later.

The image-plane AF sensor 1031 is a sensor for autofocus that includes a plurality of phase difference detection pixels. A focus detection signal detected by the image-plane AF sensor 1031 is supplied to the defocusing amount computation unit 1071. A detailed configuration of the image-plane AF sensor 1031 will be described later. The image-plane AF sensor 1031 corresponds to a second focus detection unit according to an embodiment of the present disclosure. Thus, a defocusing amount obtained from detection of focus by the image-plane AF sensor 1031 corresponds to a second defocusing amount according to the claims.

The pre-processing circuit 1040 performs sample holding or the like on the imaging signal output from the image sensor 1030 so that an S/N (Signal to Noise) ratio is satisfactorily held from a CDS (Correlated Double Sampling) process. Furthermore, gain is controlled in an AGC (Auto Gain Control) process, A/D (Analog to Digital) conversion is performed, and a digital image signal is thereby output.

The camera processing circuit 1050 performs signal processes such as a white balance adjustment process, a color correction process, a gamma correction process, a Y/C conversion process, an AE (Auto Exposure) process, and the like on the image signal output from the pre-processing circuit 1040.

The image memory 1060 is a volatile memory, or a buffer memory configured as, for example, a DRAM (Dynamic Random Access Memory), which temporarily stores image data that has undergone the predetermined processes by the pre-processing circuit 1040 and the camera processing circuit 1050.

The control unit 1070 is constituted by, for example, a CPU, a RAM, a ROM, and the like. The ROM stores programs read and operated by the CPU, and the like. The RAM is used as a work memory of the CPU. The CPU controls the entire imaging apparatus 1000 by executing various processes according to the programs stored in the ROM and issuing commands.

In addition, the control unit 1070 functions as the defocusing amount computation unit 1071, the defocusing amount selection unit 1072, the defocusing amount decision unit 1073, the defocusing amount correction unit 1074, and the focus control unit 1075 by executing a predetermined program. Each of the units may be realized by hardware with each of the functions as a dedicated device, not by a program. In this case, the imaging apparatus 1000 is configured to include the hardware.

The defocusing amount computation unit 1071 computes a defocusing amount that indicates a deviation amount from focus based on a phase difference detection signal acquired by the dedicated AF sensor 1020 or the image-plane AF sensor 1031. The defocusing amount selection unit 1072 performs a process of selecting which amount between a defocusing amount obtained from a detection result of the dedicated AF sensor 1020 (hereinafter referred to as a dedicated defocusing amount) and a defocusing amount obtained from a focus detection result of the image-plane AF sensor 1031 (hereinafter referred to as an image-plane defocusing amount) will be used in focus control and employing the result. A detailed process performed by the defocusing amount selection unit 1072 will be described later.

The defocusing amount decision unit 1073 performs a process of deciding a defocusing amount for each image-plane AF area based on the image-plane defocusing amount computed based on the focus detection result of the image-plane AF sensor. A detailed process of the defocusing amount decision unit 1073 will be described later. The defocusing amount correction unit 1074 performs a correction process of an image-plane defocusing amount. A detailed process performed by the defocusing amount correction unit 1074 will be described later. The focus control unit 1075 controls the lens drive mechanism 1012 of the optical imaging system 1010 based on the employed defocusing amount to perform a focus adjustment process.

The graphic I/F 1080 causes an image to be displayed by generating an image signal for displaying the image on the display unit 1090 from the image signal supplied from the control unit 1070 and supplying the signal to the display unit 1090. The display unit 1090 is a display unit configured as, for example, an LCD (Liquid Crystal Display), a PDP (Plasma Display Panel), an organic EL (Electro-luminescence) panel, or the like. The display unit 1090 displays a through image being captured, an image recorded in the storage medium 1120, and the like.

The input unit 1100 includes, for example, a power button for switching between on and off of power, a release button for instructing start of recording a captured image, an operator for zoom adjustment, a touch screen integrated with the display unit 1090, and the like. When an input operation is performed on the input unit 1100, a control signal according to the input is generated and output to the control unit 1070. Then, the control unit 1070 performs an arithmetic operation process and control according to the control signal.

The R/W 1110 is an interface connected to the recording medium 22 in which image data generated from imaging, and the like is recorded. The R/W 1110 writes data supplied from the control unit 1070 on the storage medium 1120, and outputs data read from the storage medium 1120 to the control unit 1070. The storage medium 1120 is a large-capacity storage medium 1120, for example, a hard disk, a Memory Stick (registered trademark of Sony Corporation), an SD memory card, or the like. Images are stored in a compressed state in the form of, for example, JPEG, or the like. In addition, EXIF (Exchangeable Image File Format) data including information of the stored images and additional information such as imaged dates, and the like is also stored therein in association with the images.

Herein, a basic operation of the imaging apparatus 1000 described above will be described. Before an image is captured, signals obtained from photoelectric conversion of light sensed by the image sensor 1030 are sequentially supplied to the pre-processing circuit 1040. The pre-processing circuit 1040 performs a CDS process, an AGC process, and the like on the input signals, and further performs conversion of the signals into image signals.

The camera processing circuit 1050 performs an image quality correction process on the image signals supplied from the pre-processing circuit 1040, and supplies the result to the graphic I/F 1080 via the control unit 1070 as signals of a camera through image. Accordingly, the camera through image is displayed on the display unit 1090. A user can adjust an angle of view while viewing the through image displayed on the display unit 1090.

In this state, when the shutter button of the input unit 1100 is pressed, the control unit 1070 outputs a control signal to the optical imaging system 1011101 to cause a shutter included in the optical imaging system 1011101 to operate. Accordingly, image signals for one frame are output from the image sensor 1030.

The camera processing circuit 1050 performs an image quality correction process on the image signals for one frame supplied from the image sensor 1030 via the pre-processing circuit 1040, and supplies the processed image signals to the control unit 1070. The control unit 1070 encodes and compresses the input image signals and supplies the generated encoded data to the R/W 1110. Accordingly, a data file of a captured still image is stored in the storage medium 1120.

Meanwhile, when the image file stored in the storage medium 1120 is reproduced, the control unit 1070 reads the selected still image file from the storage medium 1120 through the R/W 1110 according to an input operation on the input unit 1100. The read image file is subjected to an extended decoding process. Then, decoded image signals thereof are supplied to the graphic I/F 1080 via the control unit 1070. Accordingly, a still image stored in the storage medium 1120 is displayed on the display unit 1090.

Next, the configurations of the image sensor 1030 and the image-plane AF sensor 1031 will be described. FIG. 3 is a diagram illustrating the arrangement of general pixels and phase difference detection pixels in the image sensor 1030. R indicates R (Red) pixels, G indicates G (Green) pixels, and B indicates B (Blue) pixels, all of which are general imaging pixels.

In addition, in FIG. 3, P1 indicates a first phase difference detection pixel, and P2 indicates a second phase difference detection pixel. The phase difference detection pixels are configured to form pairs of P1 and P2, and perform pupil-dividing of the photographing lens 1011. The phase difference detection pixels P1 and P2 have an optical feature different from general imaging pixels. It should be noted that, in FIG. 3, G pixels are set as phase difference detection pixels. This is because there are twice as many G pixels as there are R pixels or B pixels. However, phase difference detection pixels are not limited to the G pixels.

The image sensor 1030 has the phase difference detection pixels in addition to the general pixels, and the imaging apparatus 1000 can perform so-called image-plane phase difference AF (Autofocus) using an output from the phase difference detection pixels.

Figure 4:
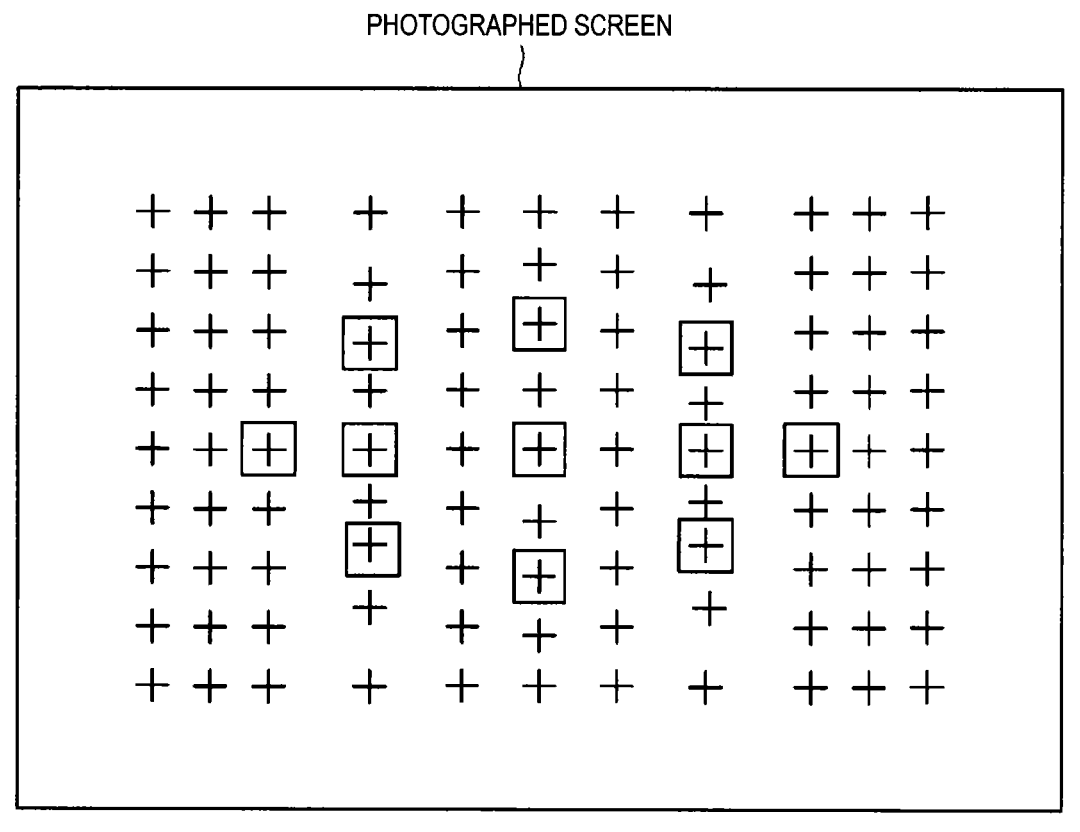

FIG. 4 is a diagram illustrating AF areas of the dedicated AF sensor 1020 on a photographed screen (hereinafter referred to as dedicated AF areas) and AF areas of the image-plane AF sensor 1031 on the photographed screen (hereinafter referred to as image-plane AF areas). Additionally, the dedicated AF area corresponds to the first focus detection area in the claims, and the image-plane AF area corresponds to the second focus detection area in the claims.

In FIG. 4, the areas indicated by square frames are the dedicated AF areas. As understood from FIG. 4, the dedicated AF areas are disposed in a narrower range than the image-plane AF areas, and concentrated substantially in the vicinity of the center. The dedicated AF sensor 1020 can detect a focus with higher accuracy than the image-plane AF sensor 1031.

The areas indicated by crosses in FIG. 4 are the image-plane AF areas. As understood from FIG. 4, the image-plane AF areas are spread in a wide range, and can complement a subject in a wide range.

There are cases in which it is difficult to uniformly dispose the AF areas at an equal interval in the dedicated AF sensor 1020 due to disposition of the areas in a dedicated optical system. For this reason, when detection results of the dedicated AF areas and the image-plane AF areas are compared as in the present technology, it is better to put the positions of the two kinds of AF areas together. To this end, the image-plane AF areas are unevenly disposed so that the positions of the image-plane AF areas are associated with the positions of the dedicated AF areas as shown in FIG. 4.

Figure 5:
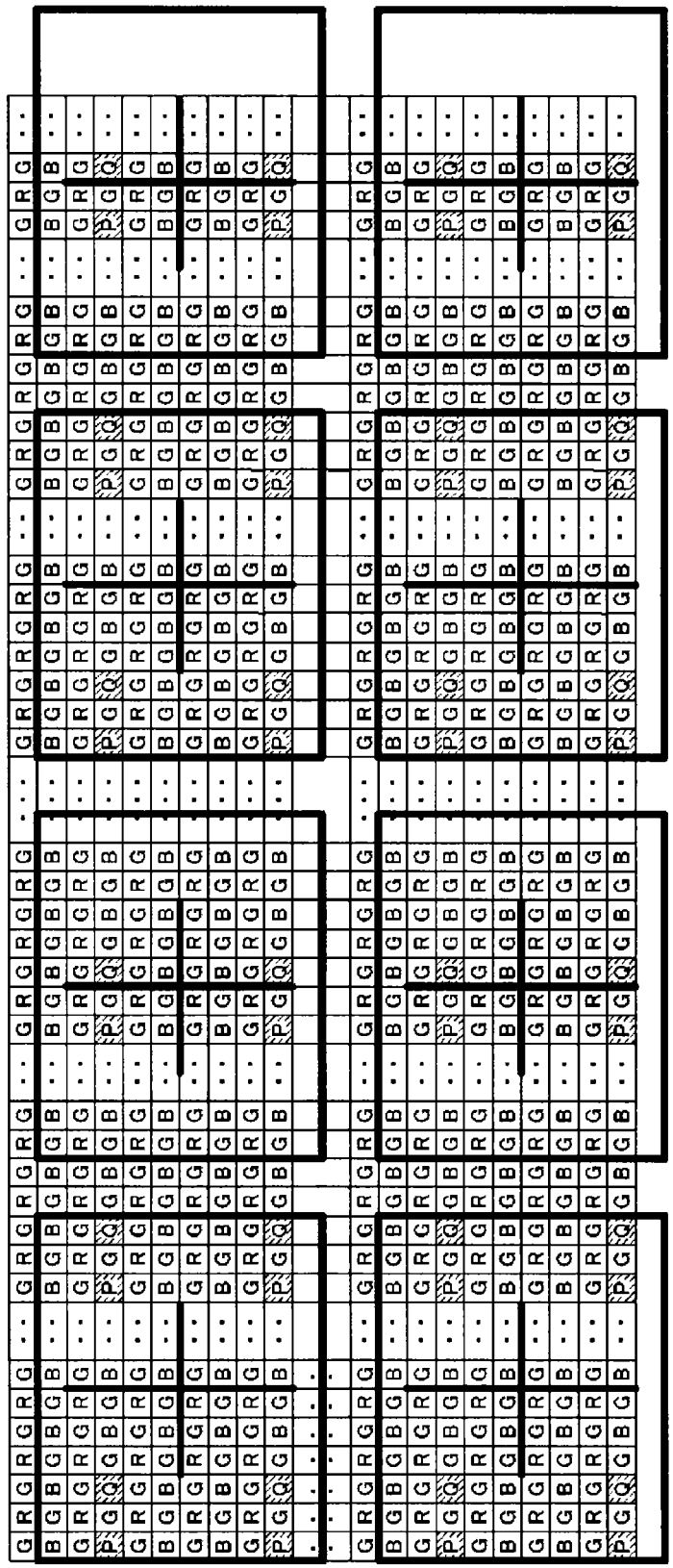
FIG. 5 is a diagram for describing a configuration of image-plane AF areas.

The phase difference detection pixels are embedded in image sensors 1030 as shown in, for example, FIG. 5 so as not to affect a photographed image. In the horizontal direction, a pair of elements (P and Q in the drawing) that are partially opened and pupil-divided for detecting a phase difference are disposed in line. In addition, in the vertical direction, lines of the phase difference pixels are embedded at an interval of several lines.

In the phase difference detection pixels disposed as described above, a plurality of phase difference detection elements are set to be an AF area as a group (for example, the rectangular frame indicated by a thick line in FIG. 5), and an arithmetic operation for focus detection is performed for each area. Accordingly, by deviating setting of the AF areas as shown in FIG. 6, uneven disposition of the AF areas as shown in FIG. 4 is possible. It should be noted that the disposition of the AF areas can be unevenly made from a process of software, but by setting disposition of the phase difference detection pixels in the image sensor 1030 to be uneven, the AF areas can also be unevenly disposed.

[1-2. Overview of Process]

Figure 8:
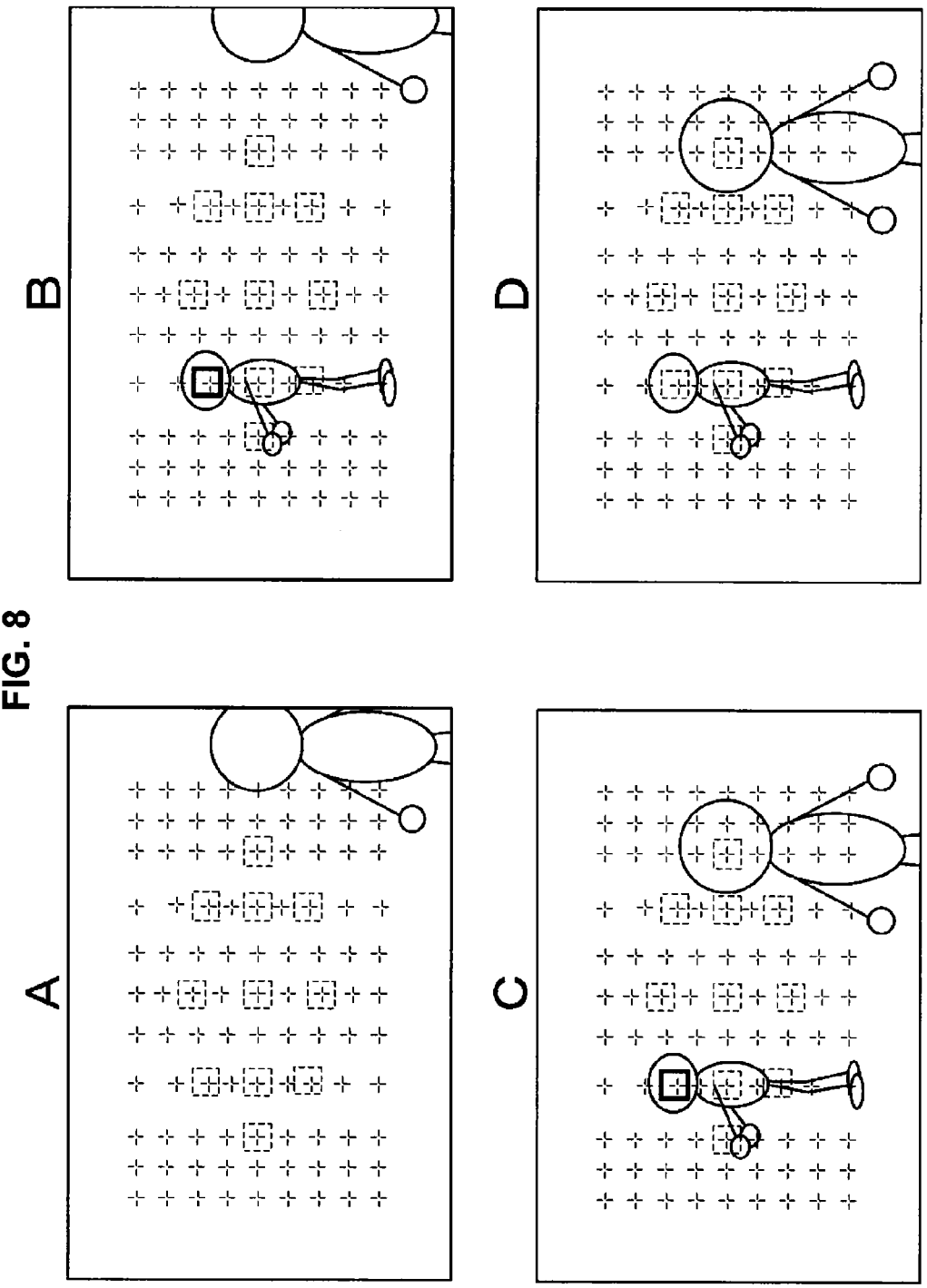
FIGS. 8A, 8B, 8C, and 8D are diagrams for describing an overview of another process in the first embodiment.
Figure 9:
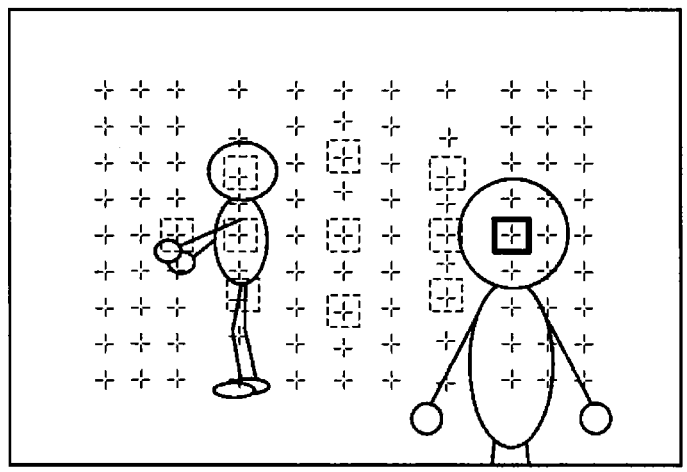
FIG. 9 is a diagram for describing an overview of still another process in the first embodiment.

Next, a process executed by the imaging apparatus 1000 will be described. First, an overview of a focusing process executed in the present embodiment will be described with reference to FIGS. 7 to 9. FIGS. 7 to 9 show dedicated AF areas within a photographed screen, image-plane AF areas within the photographed screen, and a subject traced using autofocus. In FIGS. 7 to 9, dashed-lined squares indicate the dedicated AF areas of the dedicated AF sensor 1020, and dashed-lined crosses indicate the image-plane AF areas of the image-plane AF sensor 1031.

First, FIG. 7A shows a state in which a subject is not present and autofocus is not performed. When a subject appears as shown in FIG. 7B, and a user inputs an AF instruction (for example, half-presses a shutter), a defocusing amount is first computed based on a focus detection result of the dedicated AF sensor 1020, and focus is set to be on a proximate subject (hereinafter referred to as a proximate subject) based on the defocusing amount. To be specific, focus is set to be on the proximate subject by adjusting focus of the photographing lens 1011 when the photographing lens 1011 is driven based on the defocusing amount. In FIG. 7, AF areas in which focus is on the proximate subject are indicated by solid lines.

FIG. 7C shows a case in which the subject moves after focus is on the proximate subject. Also in this case, focus is adjusted so that the subject proximate to a current focus position (subject with a minimum defocusing amount) is kept to be focused using the defocusing amount computed based on respective focus detection results of the dedicated AF sensor 1020 and the image-plane AF sensor 1031. In FIG. 7C, a dedicated AF area and image-plane AF areas in which the proximate subject is focused are all indicated by solid lines.

FIG. 7D shows a case in which the subject moves and then leaves all AF areas of the dedicated AF sensor 1020. In this case, if the subject is positioned within an image-plane AF area, focus is kept to be on the subject with a minimum defocusing amount using the defocusing amount of the image-plane AF sensor 1031. Thus, focus is not lost from a subject.

In FIG. 7D, crosses of AF areas in which focus is on the subject are indicated by solid lines. It should be noted that, in the present technology, when a subject leaves all dedicated AF areas and is positioned only on image-plane AF areas, a process of increasing accuracy of a defocusing amount is performed by the defocusing amount correction unit. Details of the process will be described.

FIG. 8A shows a case in which the subject further moves, and leaves all AF areas of the dedicated AF sensor 1020 and the image-plane AF sensor 1031. In this case, the focus adjustment process is paused for a predetermined time at the final focus position until the subject is detected again by the dedicated AF sensor 1020.

When the subject within a predetermined defocusing amount is not detected by the dedicated AF sensor 1020 even after the predetermined time elapses from the pause of the focus adjustment, focus adjustment is performed so as to focus on another subject with a minimum defocusing amount of the dedicated AF sensor 1020 as shown in FIG. 8B. Accordingly, a subject being traced is changed. In FIG. 8B, the cross of an AF area in which focus is on the subject is indicated by a solid line.

Even when the subject that was previously focused and traced enters AF areas of the dedicated AF sensor 1020 again as shown in FIG. 8C after the subject being traced is changed, focus adjustment is performed so that focus is on the changed subject.

It should be noted that, when the subject being traced is not a subject that a user desires, the input of the AF instruction is first released by the user (for example, release of half-pressing of the shutter) to pause the autofocus process. Then, there is no focus on any subject as shown in FIG. 8D.

In addition, when the user inputs an AF instruction again (for example, half-presses the shutter), focus adjustment is performed so that focus is on the proximate subject as shown in FIG. 9.

In the present technology as described above, a subject can be focused and traced with high accuracy by using the dedicated AF sensor 1020 and the image-plane AF sensor 1031 together.

Figure 10:
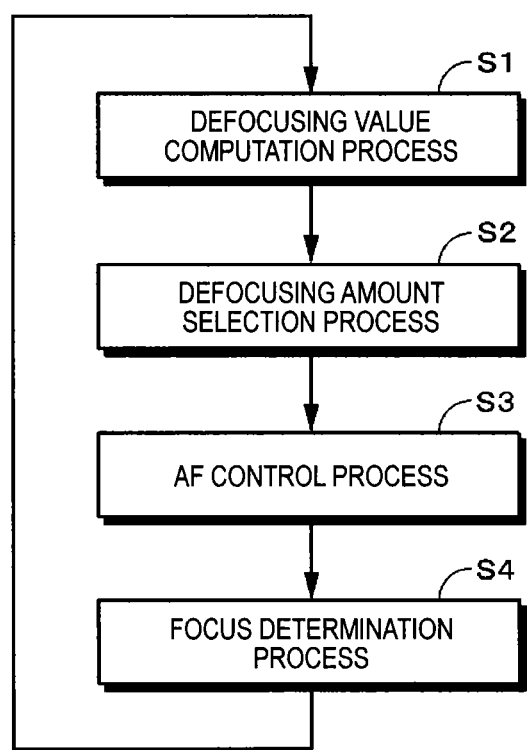
FIG. 10 is an overall flowchart for describing the processes in the first embodiment.

FIG. 10 is an overall flowchart for describing the processes performed by the imaging apparatus 1000 as shown in FIGS. 7 to 9.

First, in Step S1, the defocusing amount computation unit 1071 computes defocusing amounts. The computation of the defocusing amounts is performed based on each of a focus detection result of the image-plane AF sensor 1031 and a focus detection result of the dedicated AF sensor 1020. In other words, a defocusing amount is computed based on the focus detection result of the image-plane AF sensor 1031 and a defocusing amount is computed based on the focus detection result of the dedicated AF sensor 1020.

Next, in Step S2, the defocusing amount selection unit 1072 performs a defocusing amount selection process. The defocusing amount selection process is a process of selecting which of the defocusing amounts of the image-plane AF sensor 1031 and the dedicated AF sensor 1020 will be used in focus control as a defocusing amount. Details of the defocusing amount selection process will be described later.

Next, in Step S3, the focus control unit 1075 controls driving of the focus lens based on the defocusing amount selected from the defocusing selection process. Accordingly, focus control is performed. Furthermore, a focus determination process in Step S4 is a process of checking whether or not focus is on a subject that a user desires in a focus adjustment process. In the imaging apparatus 1000, the process is repeated as long as the user inputs an AF instruction (for example, half-presses the shutter).

[1-3. Defocusing Amount Selection Process]

Figure 11:
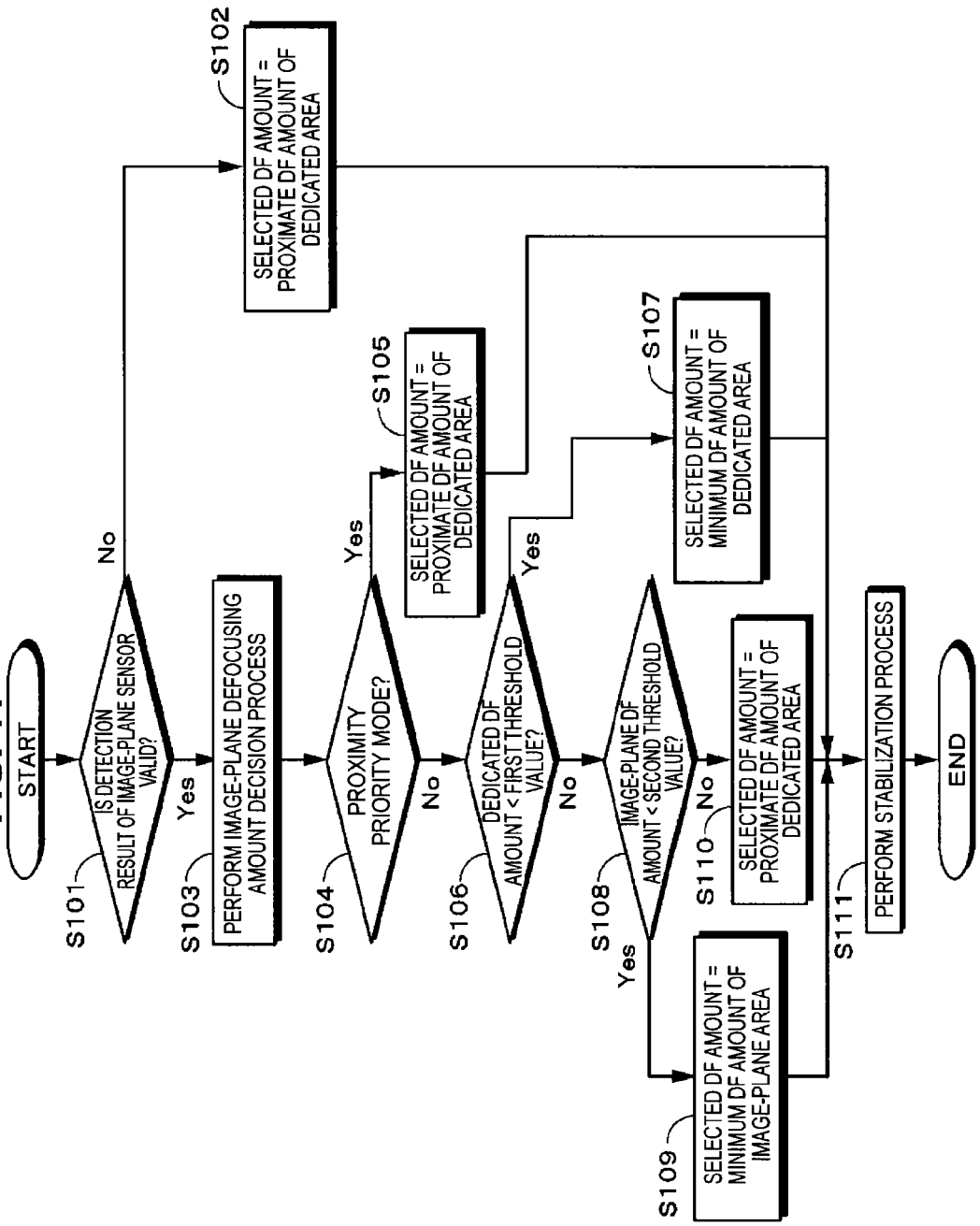
FIG. 11 is a flowchart for describing a defocusing amount selection process in the first embodiment.

Next, the defocusing amount selection process included in the overall flowchart described above will be described with reference to the flowchart of FIG. 11. First, in Step S101, it is determined whether or not a focus detection result of the image-plane AF sensor 1031 is valid. This determination is made based on, for example, a set state of the imaging apparatus 1000 by a user. The determination based on the set state is made by confirming which mode the user has selected when the imaging apparatus 1000 is configured to select an AF mode in which the image-plane AF sensor 1031 and the dedicated AF sensor 1020 are used together or another AF mode in which only the dedicated AF sensor 1020 is used. The detection result of the image-plane AF sensor 1031 is determined to be valid when a mode in which both sensors are used is selected, and the focus detection result of the image-plane AF sensor 1031 is not valid when the AF mode in which only the dedicated AF sensor 1020 is selected.

In addition, the determination of Step 101 may be made based on, for example, whether or not the detection result of the image-plane AF sensor 1031 can be used at an exposure timing. The exposure timing of the image-plane AF sensor 1031 is not synchronized with the dedicated AF sensor 1020 since reading of imaging is restricted. Thus, when a detection timing (timing of exposure end) of the image-plane AF sensor 1031 is acquired, and exposure timings are significantly deviated at a timing of exposure end of the dedicated AF sensor 1020, the focus detection result of the image-plane AF sensor 1031 is not employed. In this manner, when the determination of Step S101 is performed, and the detection result of the image-plane AF sensor 1031 is not valid, the process proceeds to Step S102 (No in Step S101).

Then, in Step S102, a proximate defocusing amount among a plurality of defocusing amounts computed based on detection results of a plurality of dedicated AF areas is selected as a defocusing amount to be used in focus control (hereinafter the selected defocusing amount is referred to as a selected defocusing amount). When there are 11 AF areas of the dedicated AF sensor 1020 as shown in FIG. 4, for example, the proximate defocusing amount among the 11 defocusing amounts is set to be a selected defocusing amount.

Description will return to Step S101. In Step S101, when the detection result of the image-plane AF sensor 1031 is determined to be valid, the process proceeds to Step S103 (Yes in Step S101). Then, an image-plane defocusing amount decision process is performed in Step S103. The image-plane defocusing amount decision process is a process of computing defocusing amounts for each of a plurality of image-plane AF areas (hereinafter referred to as image-plane defocusing amounts), and deciding an image-plane defocusing amount. Details of the image-plane defocusing amount decision process will be described later.

When an image-plane defocusing amount is decided, it is checked whether or not the imaging apparatus 1000 is in a proximity priority mode next in Step S104. The proximity priority mode is a mode in which focus is on a most proximate subject within all focus areas. When the imaging apparatus 1000 is in the proximity priority mode (Yes in Step S104), the value of a proximate defocusing amount among defocusing amounts of the dedicated AF areas (hereinafter referred to as dedicated defocusing amounts) is selected as a selected defocusing amount in Step S105. This is because a value of a proximate defocusing amount among the defocusing amounts is set to be selected according to the mode when the imaging apparatus 1000 is in the proximity priority mode. On the other hand, when the imaging apparatus 1000 is found not in the proximity priority mode in Step S104, the process proceeds to Step S106 (No in Step S104).

Next, in Step S106, it is determined whether or not the dedicated defocusing amounts obtained by the dedicated AF sensor 1020 are equal to or smaller than a first threshold value that is a predetermined threshold value. This determination is made on all of the dedicated defocusing amounts. When the dedicated defocusing amounts are equal to or smaller than the first threshold value, the process proceeds to Step S107 (Yes in Step S106), and a minimum amount among the dedicated defocusing amounts obtained for each of the plurality of dedicated AF areas is selected as a selected defocusing amount.

On the other hand, when the dedicated defocusing amounts obtained by the dedicated AF sensor 1020 are equal to or greater than the first threshold value, the process proceeds to Step S108 (No in Step S106). Next, in Step S108, it is determined whether the defocusing amounts obtained by the image-plane AF sensor 1031 are equal to or smaller than a second threshold value that is a predetermined threshold value. When the defocusing amounts are equal to or smaller than the second threshold value, the process proceeds to Step S109 (Yes in Step S108), and a minimum amount among the image-plane defocusing amounts obtained for each of the plurality of image-plane AF areas is selected as a selected defocusing amount.

On the other hand, when the defocusing amounts of the image-plane AF sensor 1031 are determined to be equal to or greater than the second threshold value in Step S108, the process proceeds to Step S110 (No in Step S108). Then, in Step S110, a minimum amount among the defocusing amounts obtained for each of the plurality of dedicated AF areas is selected as a selected defocusing amount. Next, a stabilization process is performed in Step S111.

Figure 12:
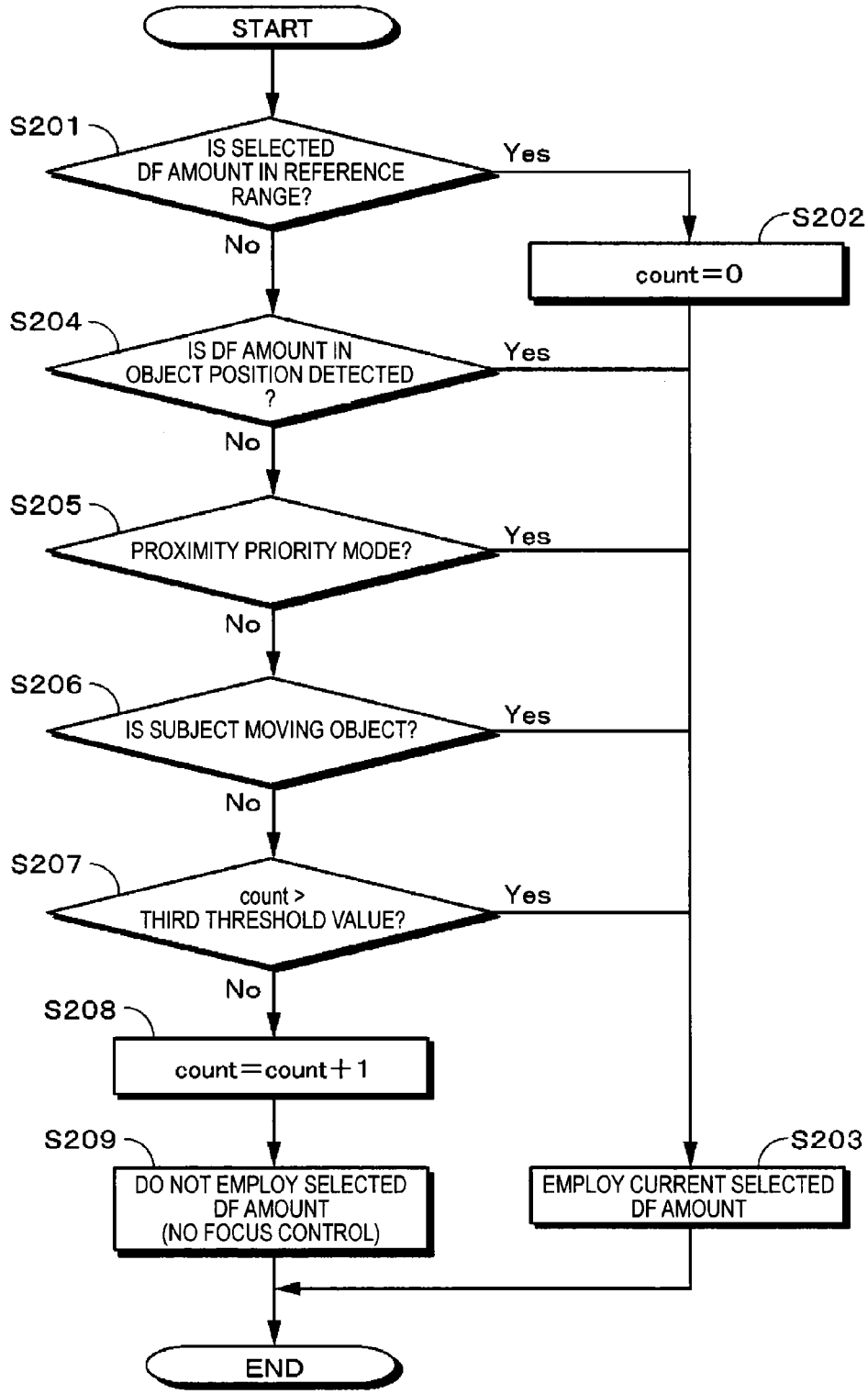
FIG. 12 is a flowchart for describing a stabilization process.

Herein, the stabilization process will be described with reference to the flowchart of FIG. 12. The stabilization process is a process of employing a selected defocusing amount as is only when the defocusing amount is not significantly changed. Accordingly, focus control can be stabilized without sharply changing a defocusing amount by a great amount.

First, in Step S201, it is determined whether or not the selected defocusing amount is a value in a predetermined reference range. When the defocusing amount is in the reference range, the process proceeds to Step S202, and a count value is set to be 0. This count value will be described later. Then, next in Step S203, the selected defocusing amount is employed as a defocusing amount to be used in focus control. In Step S203, the defocusing amount to be used in focus control is decided. The employed defocusing value is supplied to the focus control unit 1075.

Description will return to Step S201. In Step S201, when the selected defocusing amount is determined not to be in the reference range, the process proceeds to Step S204 (No in Step S201). Next, in Step S204, it is checked whether or not a defocusing amount of an object (for example, the face of a person, or the like) is obtained. When a defocusing amount of the object is obtained, the process proceeds to Step S203 (Yes in Step S204), and the selected defocusing amount is employed as a defocusing amount to be used in focus control.

On the other hand, when a defocusing amount of the object (for example, the face of a person, or the like) is not obtained, the process proceeds to Step S205 (No in Step S204). It is checked whether or not the imaging apparatus 1000 is in the proximity priority mode. When the imaging apparatus 1000 is in the proximity priority mode, the process proceeds to Step S203 (Yes in Step S205), and the selected defocusing amount is employed as a defocusing amount to be used in focus control.

When the imaging apparatus 1000 is found not in the proximity priority mode in Step S205, the process proceeds to Step S406 (No in Step S405), and it is determined whether or not the subject is a moving object. Determining whether or not the subject is a moving object can be performed using a moving object detection technique of the related art. When the subject is a moving object, the process proceeds to Step S203 (Yes in Step S206), and the selected defocusing amount is employed as a defocusing amount to be used in focus control.

On the other hand, when the subject is not a moving object, the process proceeds to Step S207 (No in Step S206). Next, it is checked whether or not a count value is equal to or greater than a third threshold value in Step S207. When the count value is equal to or greater than the third threshold value, the process proceeds to Step S203 (Yes in Step S207), and the selected defocusing amount is employed as a defocusing amount to be used in focus control.

On the other hand, when the count value is not equal to or greater than the third threshold value, the process proceeds to Step S208 (No in Step S207), and 1 is added to the count value. Then, in Step S209, the selected defocusing amount is not employed, and as a result, focus control using driving of the focus lens based on the defocusing amount is not performed either.

In the stabilization process, when the answers to the all determinations from Step S201 to Step S206 are No, it is the case in which the defocusing amount is not in the reference, a defocusing amount is not detected on the object, the imaging apparatus is not in the proximity priority mode, and the subject is not a moving object. In this case, focus control is not performed until the count value is equal to or greater than the third threshold value. Accordingly, a stand-by state in which focus control is in a paused state until the count value is equal to or greater than the third threshold value can be realized. In addition, since focus control is performed based on a defocusing amount as long as the defocusing amount is in the range, a significant change of the employed defocusing amount can be prevented. When the count value is equal to or smaller than the third threshold value, 1 is added to the count value in Step S208, and when the count value is equal to or greater than the third threshold value, the selected defocusing amount is employed as a defocusing amount to be used in focus control in Step S203. Thus, the length of the stand-by state can be adjusted according to setting of the threshold values.

[1-4. Image-plane Defocusing Amount Decision Process]

Next, the image-plane defocusing amount decision process performed in Step S103 of the defocusing amount selection process will be described with reference to the flowchart of FIG. 13. The image-plane defocusing amount decision process is performed by the defocusing amount decision unit 1073. The image-plane defocusing amount decision process is a process of deciding defocusing amounts for each image-plane AF area from a focus detection result of the image-plane AF sensor 1031.

First, in Step S301, a maximum value is substituted for an image-plane defocusing amount. Substituting the maximum value for the image-plane defocusing amount corresponds to performing initialization. For example, the image-plane defocusing amount is assumed to be defined as data with 16-bit codes. In this case, the range in which the image-plane defocusing amount can be obtained is "−32768 to +32767." Since "image-plane defocusing amount=maximum value" corresponds to initialization, the maximum value "+32767" is substituted for the amount. The image-plane defocusing amount substituted with the maximum value is called an image-plane defocusing amount for comparison because the amount is compared when the sizes of image-plane defocusing amounts obtained for each image-plane AF area are determined.

Next, in Step S202, 1 is added to a variable i for counting the number of image-plane AF areas (i=i+1). This variable i is a value from 1 to the maximum number of image-plane AF areas. Thus, when there are 100 image-plane AF areas, for example, the image-plane AF areas are numbered from 1 to 100, and the variable has a value from 1 to 100. Accordingly, the image-plane defocusing amount decision process is performed on all of the image-plane AF areas by looping the processes of the following Step S303 to Step S306.

Next, in Step S303, in an image-plane AF area corresponding to the variable to be processed, it is checked whether or not a luminance value is equal to or greater than a predetermined value, and thereby it is determined whether or not the area has low contrast. When the area is determined not to have low contrast, the process proceeds to Step S304 (No in Step S303).

Next, in Step S304, the absolute value of an image-plane defocusing amount for comparison is compared to the absolute value of the image-plane defocusing amount in the image-plane AF area corresponding to the variable i. As a result of the comparison, when the absolute value of the image-plane defocusing amount in the $i^{th}$ image-plane AF area is greater than the absolute value of the image-plane defocusing amount for comparison, the process proceeds to Step S305 (Yes in Step S304). Then, in Step S305, it is set that "the absolute value of the image-plane defocusing amount for comparison=the absolute value" of the image-plane defocusing amount, and the defocusing amount of the $i^{th}$ image-plane AF area is decided.

On the other hand, in Step S304, when the absolute value of the image-plane defocusing amount in the $i^{th}$ image-plane AF area is smaller than the absolute value of the image-plane defocusing amount for comparison, the process proceeds to Step S306 (No in Step S304) without performing the process of Step S305. In addition, even when the area is determined to have low contrast in Step S303, the process proceeds to Step S306 (Yes in Step S303) without performing the process of Step S305. In this case, since the process of Step S305 is not performed, the image-plane defocusing amount is not decided.

Next, in Step S306, it is determined whether or not the variable i reaches the number of image-plane AF areas.

When the variable i does not reach the number of image-plane AF areas, the process proceeds to Step S302 (No in Step S306). Then, the processes from Step S302 to Step S306 are repeated until the variable i reaches the number of image-plane AF areas. Accordingly, the processes from Step S302 to Step S306 are performed on all of the image-plane AF areas.

When the variable i reaches the number of image-plane AF areas, the process proceeds to Step S307 (Yes in Step S306). Then, in Step S307, a previously-decided image-plane defocusing amount determination process is performed.

Figure 14:
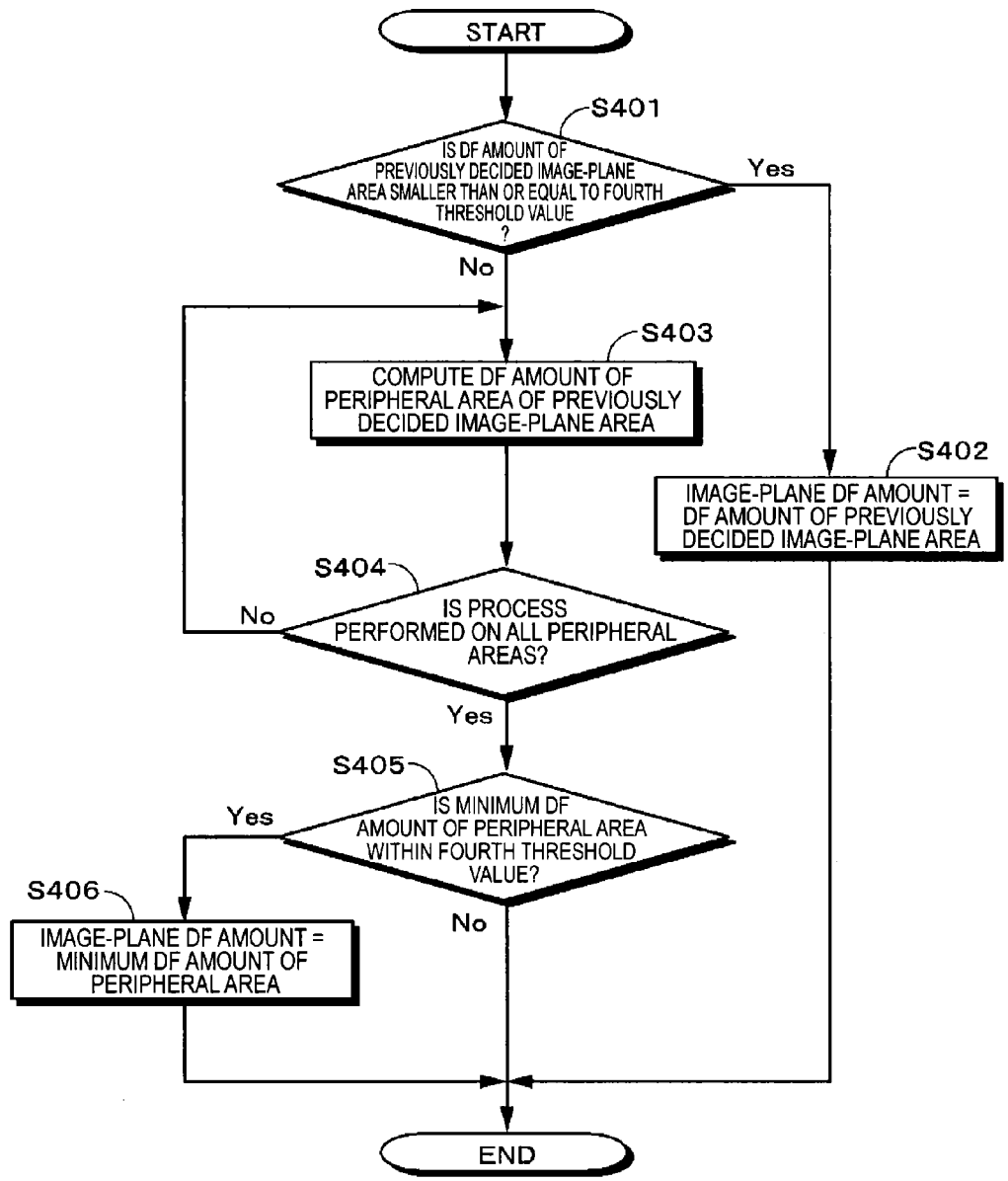
FIG. 14 is a flowchart for describing a previously decided image-plane defocusing amount determination process.

Herein, the previously-decided image-plane defocusing amount determination process will be described with reference to the flowchart of FIG. 14. When approximate defocusing amounts are obtained from a plurality of separate image-plane AF areas, for example, there is concern that a focus position changes much, and focus is not on a main subject. Thus, the previously-decided image-plane defocusing amount determination process is a process for preventing a fine change in focus by continuously deciding the image-plane defocusing amounts previously decided as image-plane defocusing amounts when image-plane defocusing amounts for each image-plane AF area decided in the previous process are equal to or smaller than a predetermined amount.

First, in Step S401, it is determined whether or not the previously decided image-plane defocusing amounts are equal to or smaller than a fourth threshold value that is a predetermined threshold value. When the image-plane defocusing amounts are equal to or smaller than the fourth threshold value, the process proceeds to Step S402 (Yes in Step S401). Then, in Step S402, the previously decided image-plane defocusing amounts are decided as image-plane defocusing amounts again.

On the other hand, in Step S401, when the image-plane defocusing amounts are determined to be equal to or greater than the fourth threshold value, the process proceeds to Step S403 (No in Step S401). Then, in Step S403, defocusing amounts of peripheral image-plane AF areas of the image-plane AF area for which the previously decided image-plane defocusing amount is obtained are computed.

The peripheral areas are, for example, 8 image-plane AF areas in the periphery of the image-plane AF areas for which the previously decided defocusing amounts are computed, four areas in the upper, lower, right, and left sides thereof, or the like.

Next, in Step S404, it is checked whether or not defocusing amounts have been computed for all image-plane AF areas in the periphery of the image-plane AF areas. Regarding the image-plane AF areas in the periphery, the processes of Step S403 and Step S404 are repeated until image-plane defocusing amounts of all of the peripheral image-plane AF areas are computed (No in Step S404).

Then, after the computation of the defocusing amounts is performed for all of the peripheral areas, the process proceeds to Step S405 (Yes in Step S404). Next, in Step S405, it is determined whether a minimum value of the defocusing amounts of all of the peripheral areas is within the fourth threshold value, and when the value is determined to be within the fourth threshold value, the process proceeds to Step S406 (Yes in Step S305).

Then, in Step S406, the minimum value of the defocusing amounts of all of the peripheral areas is decided to be an image-plane defocusing amount. When the previously decided defocusing amounts of the image-plane AF areas are equal to or greater than the threshold value, the defocusing amount of a peripheral image-plane AF area corresponding to the movement destination of the subject when the subject moves to the periphery of the areas is employed as an image-plane defocusing amount.

Figure 13:
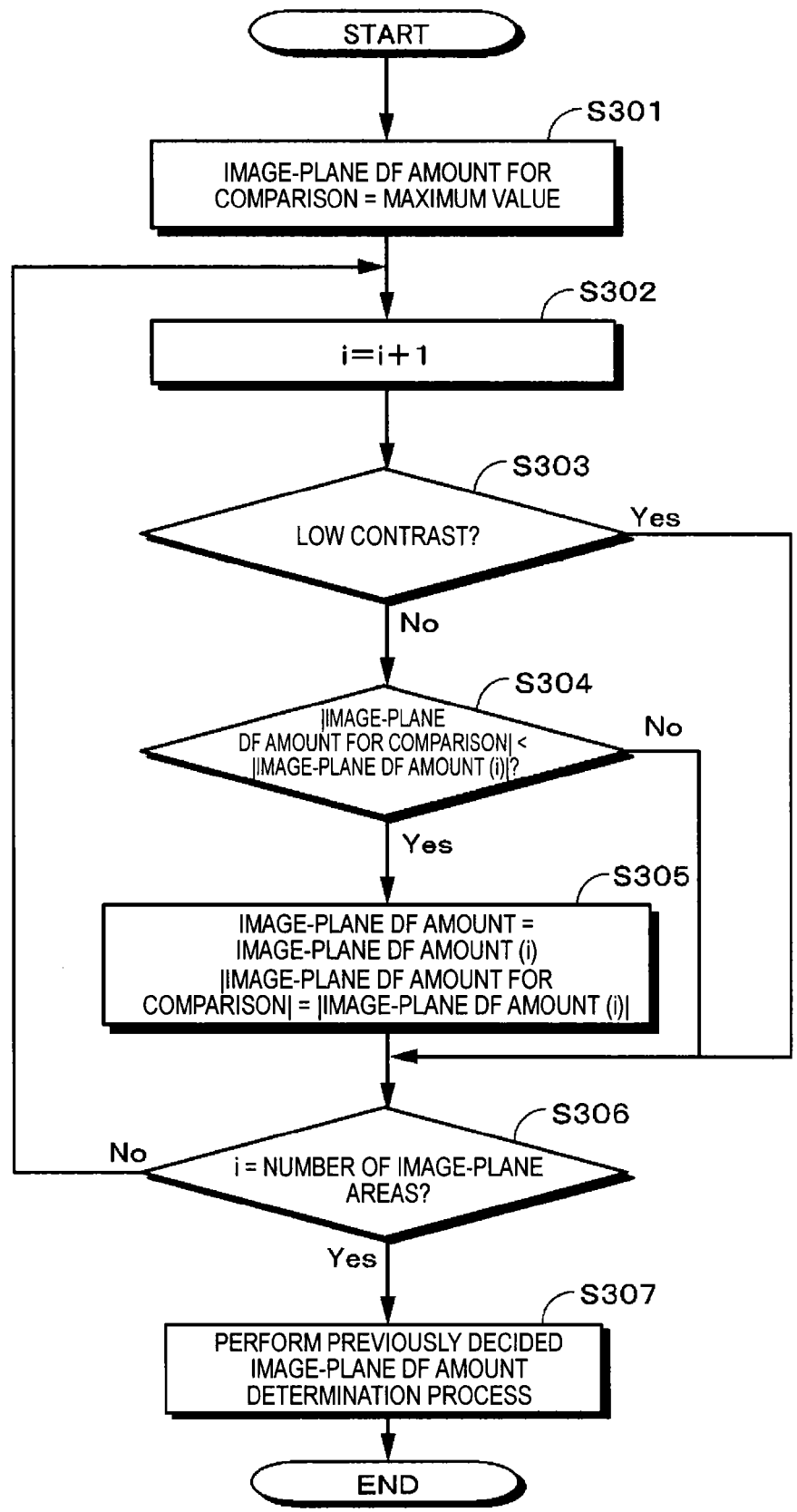
FIG. 13 is a flowchart for describing an image-plane defocusing amount decision process in the first embodiment.

When the minimum value of the defocusing amounts of all of the peripheral areas is determined to be more than the fourth threshold value in Step S405, the image-plane defocusing amount decided in the process of the flowchart of FIG. 13 is decided as an image-plane defocusing amount rather than the previously employed image-plane defocusing amount (No in Step S405).

As described above, either of the defocusing amount obtained by the dedicated AF sensor 1020 or the defocusing amount obtained by the image-plane AF sensor 1031 is selected to be used in focus control. Accordingly, autofocus in a wide range by the image-plane AF sensor 1031 can be compatible with autofocus with high accuracy by the image-plane AF sensor 1031.

[1-5. Image-Plane Defocusing Amount Correction Process]

Figure 15:
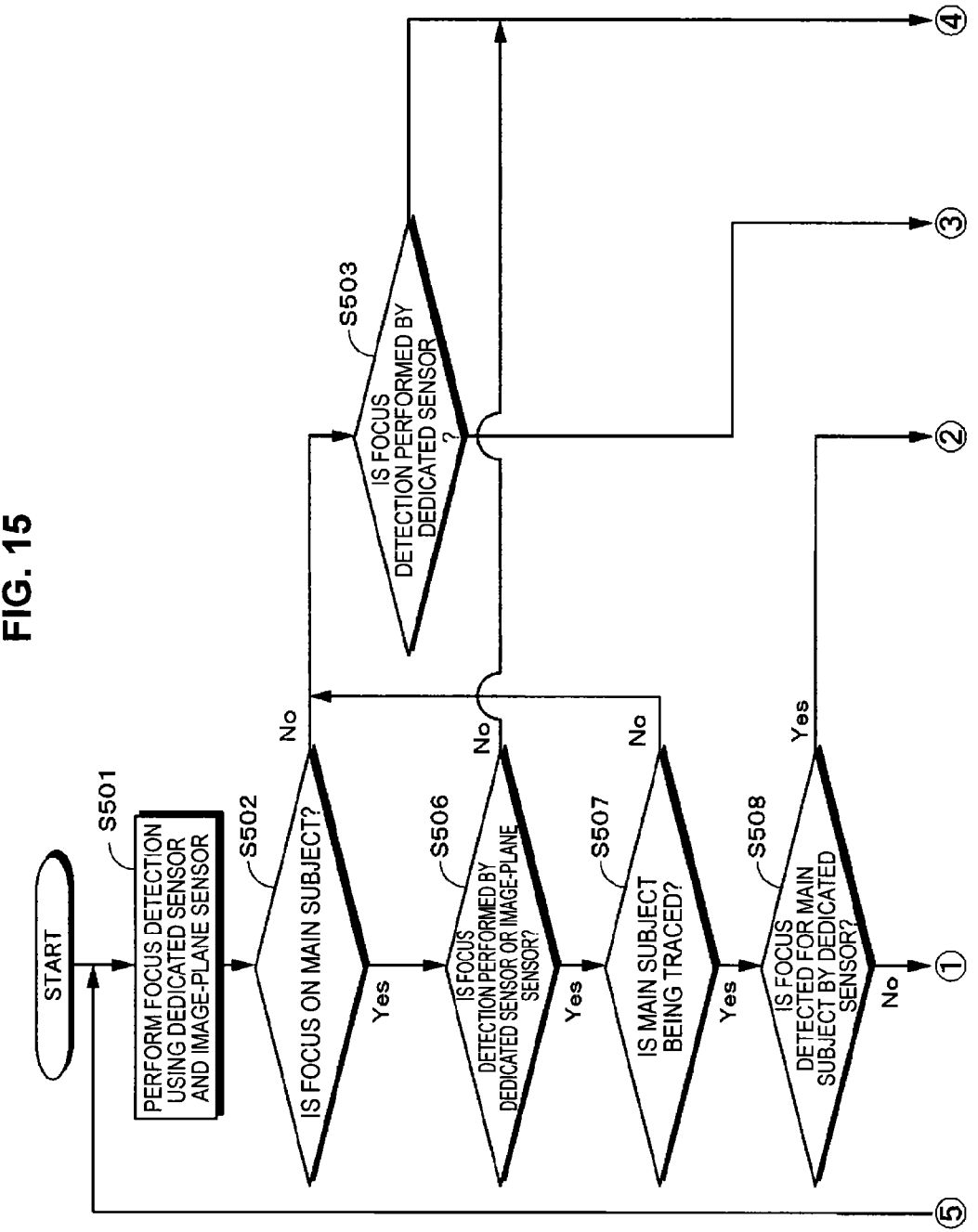
FIG. 15 is a flowchart for describing an image-plane defocusing amount correction process.
Figure 16:
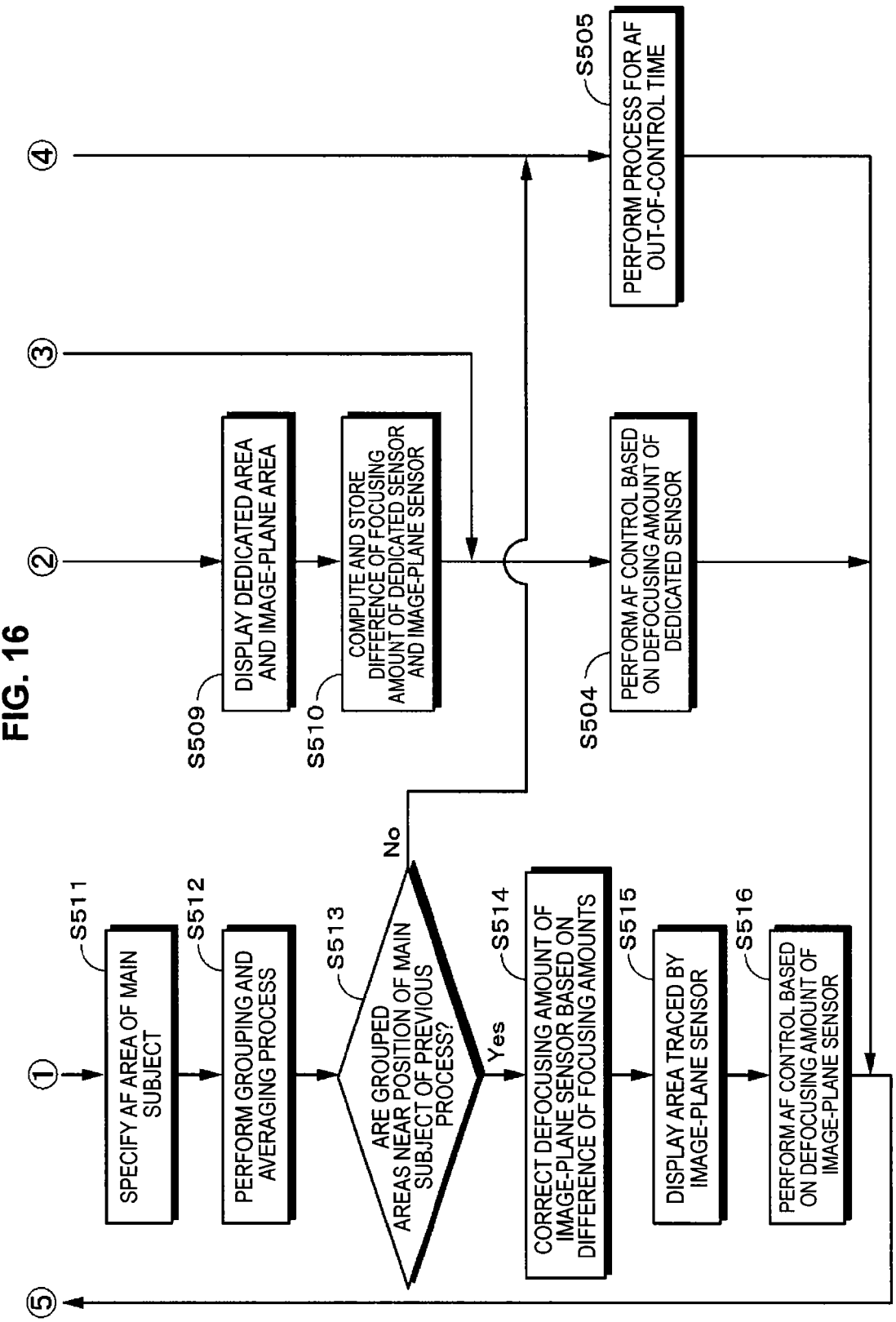
FIG. 16 is a flowchart for describing the image-plane defocusing amount correction process.

Next, a process of increasing accuracy of an image-plane defocusing amount by correcting the image-plane defocusing amount when a subject leaves all of the dedicated AF areas and is positioned on the image-plane AF areas as shown in FIG. 7D will be described. FIGS. 15 and 16 are flowcharts showing a flow of an image-plane focusing correction process. The image-plane focusing amount correction process is for correcting an image-plane defocusing amount based on the difference between a defocusing amount obtained by the dedicated AF sensor 1020 and a defocusing amount obtained by the image-plane AF sensor 1031. The image-plane focusing amount correction process is performed by the defocusing amount correction unit 1074.

First, in Step S501, the dedicated AF sensor 1020 and the image-plane AF sensor 1031 respectively perform focus detection. Next, in Step S502, it is determined whether or not focus is on a subject (main subject) targeted by a user among subjects (whether or not a subject to be traced is decided). When focus is not on the main subject, the process proceeds to Step S503 (Yes in Step S502).

Next, in Step S503, it is checked whether or not the focus detection by the dedicated AF sensor 1020 has been performed. When the focus detection by the dedicated AF sensor 1020 has been performed, the process proceeds to Step S504, AF control is performed based on the defocusing amount obtained from the focus detection by the dedicated AF sensor 1020. As long as the focus detection by the dedicated AF sensor 1020 is performed, AF control is performed in Step S504 based on the defocusing amount obtained by the dedicated AF sensor 1020. It should be noted that the AF control in Step S504 corresponds to the AF control process in Step S3 of the flowchart of FIG. 10.

On the other hand, when the focus detection by the dedicated AF sensor 1020 has not been performed in Step S503, the process proceeds to Step S505 (No in Step S503). Then, in Step S505, a process for an AF out-of-control time is performed. When AF control is not available without performing the focus detection by the dedicated AF sensor 1020, for example, the imaging apparatus 1000 is in a photographing unavailable state with a nullified release button. Such nullification of the release button may be cancelled when, for example, focus detection is then performed by the dedicated AF sensor 1020.

Description will return to Step S502. When focus is determined to be on the subject targeted by the user among subjects in Step S502, the process proceeds to Step S506 (Yes in Step S502). Next, in Step S503, it is checked whether or not focus detection has been performed by the dedicated AF sensor 1020 or the image-plane AF sensor 1031. When the focus detection is performed by neither the dedicated AF sensor 1020 nor the image-plane AF sensor 1031, the process proceeds to Step S505, and the process for AF out-of-control time is performed (No in Step S506). The process for AF out-of-control time is, for example, nullification of the release button as described above. This is because photographing is difficult to perform when neither the dedicated AF sensor 1020 nor the image-plane AF sensor 1031 is available to perform focus detection. Nullification of the release button may be cancelled when, for example, focus detection is performed by the dedicated AF sensor 1020 thereafter.

On the other hand, when the focus detection is determined to be performed by the dedicated AF sensor 1020 or the image-plane AF sensor 1031 in Step S506, the process proceeds to Step S507 (Yes in Step S506). Next, in Step S507, it is determined whether or not the main subject is focused and traced. The determination is possible in such a way that it is checked whether or not there is an area having a focus deviation amount equal to or smaller than a predetermined value, and whether or not there is an AF area in which focus is substantially on the main subject of a previous AF operation among a plurality of AF areas.

When the main subject is not focused or traced, the process proceeds to Step S503 (No in Step S507). Then, if focus detection by the dedicated AF sensor 1020 is possible in Step S503, AF control is performed based on a defocusing amount detected by the dedicated AF sensor 1020 in Step S504. In addition, if focus detection by the dedicated AF sensor 1020 is unavailable in Step S503, the process for AF out-of-control time is performed in Step S505.

When the main subject is confirmed as being traced in Step S507, the process proceeds to Step S508 (Yes in Step S507). Next, in Step S508, it is checked whether or not the area in which the main subject is detected as being traced is a dedicated AF area. When the main subject is detected in a dedicated AF area, the display unit displays areas of the dedicated AF sensor 1020 and the image-plane AF sensor 1031 in Step S509.

In the display of the area in Step S509, for example, crosses overlapping with the subject among crosses indicating the image-plane AF areas may be indicated by thick lines as shown in FIG. 7D. Thereby, the user can easily recognize a current subject and areas in which the subject is detected. In addition, the areas may be displayed by coloring the crosses overlapping with the subject instead of, or in addition to, the display of the thick lines.

Next, in Step S510, the difference between a defocusing amount in the dedicated AF area overlapping with the subject and a defocusing amount in the image-plane AF area is computed, and stored in a storage unit, a cache memory, or the like of the imaging apparatus 1000.

As a method for computing the difference, for example, there is a method for obtaining the difference of respective defocusing amounts detected in an overlapping with dedicated AF area and image-plane AF area. In addition, the difference may be obtained by associating a defocusing amount of one dedicated AF area and the average of defocusing amounts of a plurality of image-plane AF areas in the periphery of the dedicated AF area. Furthermore, the difference of defocusing amounts is also affected by an aberration property of the photographing lens 1011, and thus when, for example, a subject is positioned apart from substantially the center of a frame, an offset amount may be added to the difference, considering an aberration amount of the photographing lens 1011.

As will be described in detail, the difference is used to correct focus adjustment when the main subject leaves all of the dedicated AF areas and is positioned only in the image-plane AF areas.

Next, in Step S504, AF control is performed based on the defocusing amount of the dedicated AF sensor 1020. This is because AF control is better performed using the defocusing amount of the dedicated AF sensor 1020 when the main subject overlaps with the dedicated AF area since the dedicated AF sensor 1020 shows higher AF accuracy than the image-plane AF sensor 1031. Then, the process returns to Step S501.

Description will return to Step S508. When the area in which the subject is detected as being traced is determined not to be a dedicated AF area in Step S508, the process proceeds to Step S511 (No in Step S508).

The area in which the main subject is being traced is not a dedicated AF area when the main subject is detected in the image-plane AF areas only by the image-plane AF sensor 1031. Thus, next in Step S511, the image-plane AF area in which the main subject is detected is specified. As a method for specification, for example, an area for which a defocusing amount equal to or smaller than a predetermined value is detected is specified from a plurality of image-plane AF areas near a dedicated AF area in which a main subject has been detected, and a subject detected in the specified area is assumed to be the same subject as the main subject.

Next, in Step S512, the plurality of image-plane AF areas considered to overlap with the main subject are grouped, and a predetermined data process such as an averaging process of defocusing amounts detected in the image-plane AF areas is performed so that tracing of AF is smoothly performed.

Next, in Step S513, it is determined whether or not the plurality of grouped image-plane AF areas are near the position of the main subject in the previous process. This is a process for continuing tracing only when the plurality of grouped image-plane AF areas are near the area in which the subject is detected in the previous focus detection so that focus is not on a subject other than the main subject when the subject is in the area. Here, being near means, for example, a state in which areas are neighboring.

When the plurality of grouped image-plane AF areas are near the position of the main subject in the previous process, the process proceeds to Step S505 (No in Step S513). Then, in Step S505, the process for AF out-of-control time is performed. The process for AF out-of-control time is the same as described above.

On the other hand, when the plurality of grouped image-plane AF areas are near the position of the main subject in the previous process, the process proceeds to Step S514 (Yes in Step S513). Then, in Step S514, using the difference of the defocusing amounts computed and stored in Step S510, the defocusing amount detected by the image-plane AF sensor 1031 is corrected.

In general, accuracy of focus detection by the image-plane AF sensor is lower than that by the dedicated AF sensor in many cases. Thus, in AF areas of the dedicated AF areas and the image-plane AF areas overlapping with each other in a state in which the dedicated AF sensor 1020 can perform focus detection, the difference of two focus detection results is computed. Then, when a subject overlaps with only image-plane AF areas, focus detection by the image-plane AF sensor 1031 is corrected using the difference. Accordingly, the sole image-plane AF sensor 1031 can perform focus detection with accuracy of the same degree as the dedicated AF sensor 1020.

Next, in Step S515, areas traced by the image-plane AF sensor 1031 are displayed. In the display of the areas in Step S515, for example, crosses and a frame overlapping with the subject among crosses indicating the image-plane AF sensor 1031 and frames indicating the dedicated AF areas may be indicated by thick lines as shown in FIG. 7C. Accordingly, the user can easily recognize areas in which the subject is currently detected. In addition, the areas may be displayed by coloring the crosses and the frame overlapping with the subject instead of, or in addition to, the display of the thick lines.

Then, in Step S516, AF control is performed based on the corrected defocusing amount of the image-plane AF sensor 1031. The AF control corresponds to the AF control process in Step S3 of the flowchart of FIG. 10.

As described above, in the image-plane defocusing amount correction process, when both of the dedicated AF sensor 1020 and the image-plane AF sensor 1031 can perform focus detection, the difference between a defocusing amount of the dedicated AF sensor 1020 and a defocusing amount of the image-plane AF sensor 1031 is constantly computed. Then, when a subject leaves all dedicated AF areas and only the image-plane AF sensor 1031 can perform focus detection, the defocusing amount of the image-plane AF sensor 1031 is corrected using the computed difference. Accordingly, accuracy of focus detection by the image-plane AF sensor 1031 can improve, and autofocus with high accuracy and a wide range of AF areas can be compatible.

<2. Second Embodiment>

[2-1. Configuration of Imaging Apparatus]

Next, a second embodiment of the present technology will be described.

Figure 17:
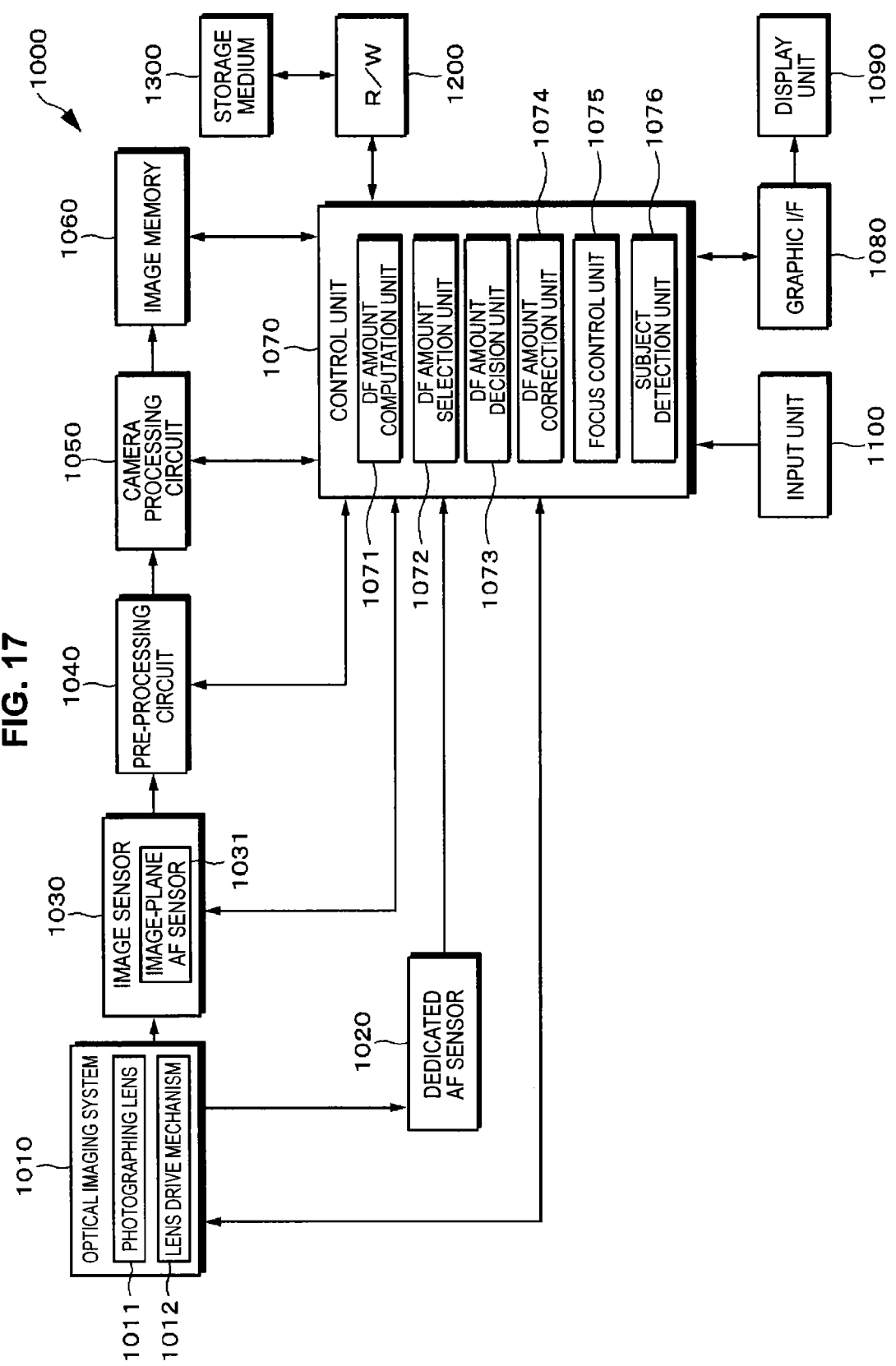
FIG. 17 is a block diagram illustrating a configuration of an imaging apparatus according to a second embodiment of the present technology.

FIG. 17 is a block diagram illustrating another configuration of the imaging apparatus 1000 according to the second embodiment. The imaging apparatus 1000 in the second embodiment has a subject detection unit 1076.

The subject detection unit 1076 detects a subject from an image of supplied image data. As a subject, for example, there is the face of a person, or the like. In the second embodiment, a subject is a person, and a case in which the face of the person is detected will be exemplified. However, a target to be detected by the subject detection unit 1076 does not have to be the face of a person, and animals, buildings, and the like are possible as long as they are detectable objects.

As a detection method, template matching based on the shape of a face, template matching based on luminance distribution of a face, a method based on feature amounts of skin or the face of a person included in an image, and the like can be used. In addition, the methods can be combined in order to increase accuracy in face detection. It should be noted that, since the constituent elements other than the subject detection unit 1076 are the same as those of the first embodiment, description thereof will not be repeated.

[2-2. Overview of Process]

Figure 18:
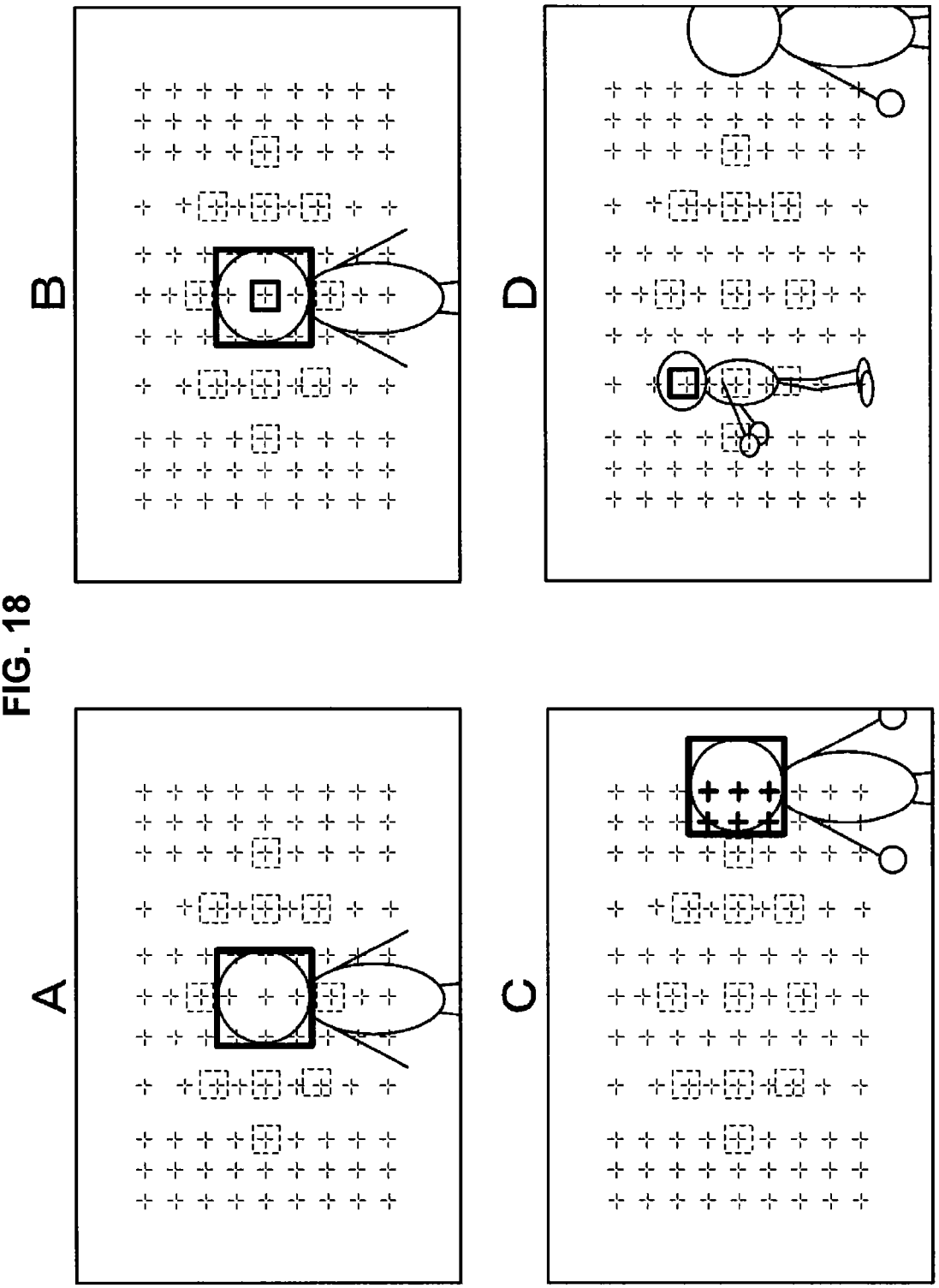
FIGS. 18A, 18B, 18C, and 18D are diagrams for describing a first example of an overview of a process in the second embodiment.

Next, a process performed in the second embodiment will be described. First, an overview of a focusing process performed in the present embodiment will be described with reference to FIGS. 18 to 19. FIG. 18 shows a first example of the second embodiment, and FIG. 19 shows a second example of the second embodiment. FIGS. 18 to 19 show dedicated AF areas in a photographed screen, image-plane AF areas in the photographed screen, and subjects traced using autofocus. In FIGS. 18 and 19, dashed-lined squares indicate AF areas of the dedicated AF sensor 1020, and dashed-lined crosses indicate AF areas of the image-plane AF sensor 1031.

In the first example of FIG. 18, the face of a subject to be photographed is first detected in the photographed screen as shown in FIG. 18A. The face of the subject is positioned on a dedicated AF area and image-plane AF areas. In this case, focus control is performed using defocusing amounts in the areas overlapping with the subject as shown in FIG. 18B. It should be noted that, when the face of the subject overlaps with both dedicated AF areas and image-plane AF areas, focus control may be performed based on a defocusing amount detected by the dedicated AF sensor 1020. This is because the dedicated AF sensor 1020 exhibits higher accuracy in focus detection than the image-plane AF sensor 1031.

Then, when focus is on the subject, and then the subject moves as shown in FIG. 18C, focus control is performed based on the defocusing amount of the AF areas in which the subject that has moved is positioned. In addition, when the position of the face of the subject leaves all of the AF areas as shown in FIG. 18D, the imaging apparatus 1000 stands by holding the process in a standby state for a predetermined period of time. In addition, when the subject enters the AF areas again within a predetermined period of time, focus control is performed based on the defocusing amount of the AF areas in which the face of the subject is positioned. On the other hand, when the subject does not enter the AF areas within the predetermined period of time, another subject positioned in the AF areas is focused on as shown in FIG. 18D.

In the second example of FIG. 19, the face of a subject to be photographed in the photographed screen is first detected as shown in FIG. 19A. The face of the subject is positioned in image-plane AF areas. In this case, focus control is performed using a defocusing amount of the image-plane AF areas overlapping with the face as shown in FIG. 19B.

In addition, when focus is on the subject, and then the subject moves as shown in FIG. 19C, focus control is performed based on the defocusing amount of the AF areas in which the subject that has moved is positioned. In addition, when the position of the face of the subject leaves all of the AF areas as shown in FIG. 19D, the imaging apparatus 1000 stands by holding the process in a standby state for a predetermined period of time. In addition, when the subject enters the AF areas again within a predetermined period of time, focus control is performed based on the defocusing amount of the AF areas in which the face of the subject is positioned. On the other hand, when the subject does not enter the AF areas within the predetermined period of time, another subject positioned in the AF areas is focused on as shown in FIG. 19D. It should be noted that the flowchart of the entire process is the same as that of the first embodiment shown in FIG. 10.

[2-3. Defocusing Amount Selection Process]

Figure 20:
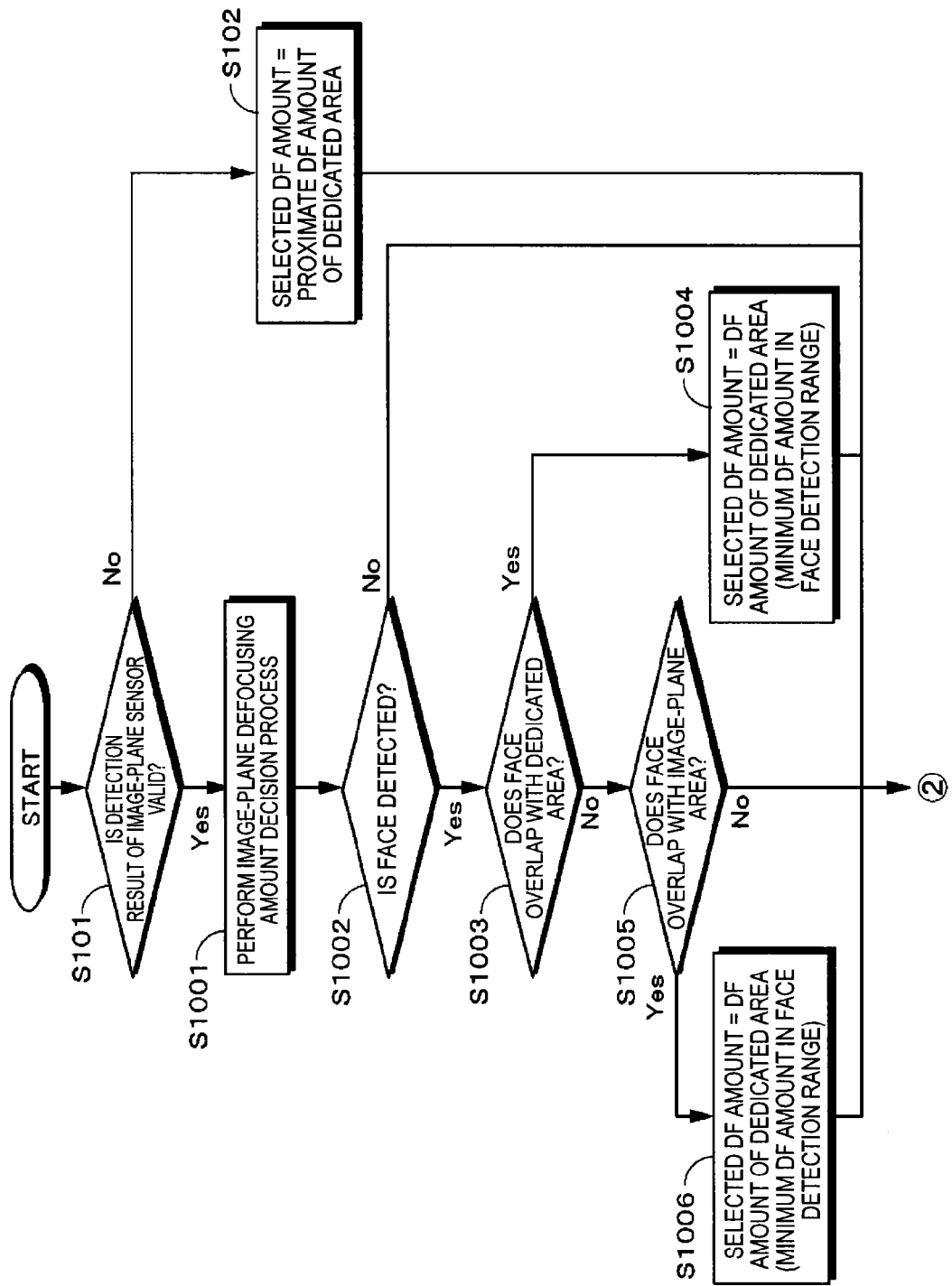
FIG. 20 is a flowchart for describing another defocusing amount selection process in the first embodiment.
Figure 21:
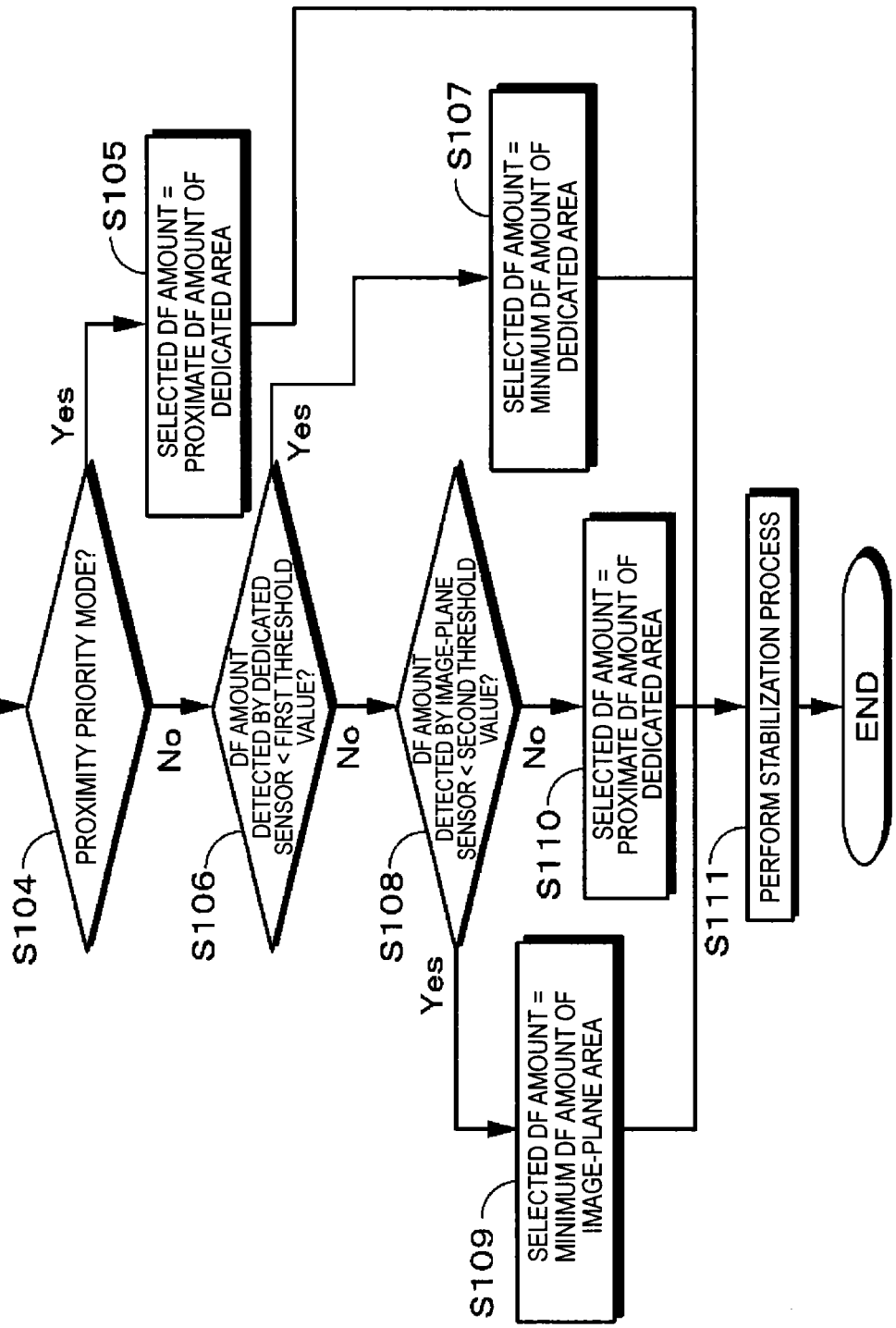
FIG. 21 is a flowchart for describing the defocusing amount selection process in the first embodiment.

Next, the defocusing amount selection process included in the overall flowchart described above will be described with reference to the flowcharts of FIGS. 20 and 21. Since the processes other than those in Steps S1001 to S1006 in the flowcharts of FIGS. 20 and 21 are the same as those in the first embodiment, description thereof will not be repeated.

After an image-plane defocusing amount decision process is performed in Step S1001, the process proceeds to Step S1002. It should be noted that the image-plane defocusing amount decision process of the second embodiment will be described later in detail. However, the image-plane defocusing amount decision process of the second embodiment is also a process in which defocusing amounts are computed for each of a plurality of image-plane AF areas and an image-plane defocusing amount is decided in the same manner as in the first embodiment.

Next, in Step S1002, it is determined whether or not the face of a subject has been detected in a photographed screen. When the face has not been detected, the process proceeds to Step S104 (No in Step S1002).

On the other hand, when the face has been detected, the process proceeds to Step S1003 (Yes in Step S1002). Next, in Step S1003, it is determined whether or not the detected face overlaps with dedicated AF areas. When the face overlaps with the dedicated AF areas, a minimum defocusing amount among the defocusing amounts of the dedicated AF areas located in the region detected as the face is set to be a selected defocusing amount in Step S1004 (Yes in Step S1003).

When the detected face does not overlap with the dedicated AF areas in Step S1003, the process proceeds to Step S1005 (No in Step S1004). Next, in Step S1005, it is determined whether or not the detected face overlaps with image-plane AF areas. When the face overlaps with the image-plane AF areas, a minimum defocusing amount among the defocusing amounts of the plurality of image-plane AF areas located in the region detected as the face is set to be a selected defocusing amount in Step S1006 (Yes in Step S1005).

Since other processes are the same as those of the first embodiment, description thereof will not be repeated. It should be noted that a stabilization process is also the same as that of the first embodiment.

Next, an image-plane defocusing amount decision process in the second embodiment will be described with reference to the flowchart of FIG. 22. It should be noted that, since processes other than those in Steps S3001 to S3004 in the flowchart of FIG. 22 are the same as those in the first embodiment, description thereof will not be repeated.

First, in Step S3001, a maximum value is substituted for an image-plane face defocusing amount. The image-plane face defocusing amount refers to a defocusing amount of image-plane AF areas overlapping with a region detected as the face of a subject in a photographed screen. Substituting the maximum value for the image-plane face defocusing amount corresponds to performing initialization. For example, the image-plane face defocusing amount is assumed to be defined as data with 16-bit codes. In this case, the range in which the image-plane face defocusing amount can be obtained is "−32768 to +32767." Since "image-plane face defocusing amount=maximum value" corresponds to initialization, the maximum value "+32767" is substituted for the amount. The image-plane face defocusing amount substituted with the maximum value is called an image-plane face defocusing amount for comparison because the amount is compared when the sizes of image-plane defocusing amounts obtained for each image-plane AF area overlapping with a face region are determined.

In addition, in Step S3001, the maximum value is substituted for an image-plane defocusing amount for comparison in the same manner as in the first embodiment. In Step S302, substituting 1 for a variable i is also the same as in the first embodiment.

In Step S303, when the area is determined not to have low contrast, the process proceeds to Step S3001 (No in Step S303). Next, in Step S3002, it is checked whether or not an image-plane AF area among the plurality of image-plane AF areas corresponding to the variable i overlaps with the region detected as the face.

When the image-plane AF area corresponding to the variable i overlaps with the face region, the process proceeds to Step S3003 (Yes in Step S3002). Next, in Step S3003, the absolute value of the image-plane face defocusing amount for comparison is compared to the absolute value of the image-plane defocusing amount in an $i^{th}$ image-plane AF area. As a result of the comparison, when the absolute value of the image-plane defocusing amount in the $i^{th}$ image-plane AF area is smaller than the absolute value of the image-plane face defocusing amount for comparison, the process proceeds to Step S3004 (No in Step S3003). Then, in Step S3004, the defocusing amount of the $i^{th}$ image-plane AF area overlapping with the face region is decided.

On the other hand, when the absolute value of the image-plane defocusing amount in the $i^{th}$ image-plane AF area is greater than the absolute value of the image-plane face defocusing amount for comparison in Step S3003, the process proceeds to Step S304 (Yes in Step S3003) without performing the process of Step S3004. In addition, when the image-plane AF area corresponding to the variable i overlaps with the face region in Step S3002, the process also proceeds to Step S304 (Yes in Step S3002) without performing the process of Step S3004. Since the process of Step S3004 is not performed in this case, the image-plane defocusing amount of the $i^{th}$ image-plane AF area overlapping with the face region remains undecided. As described above, in the second embodiment, the defocusing amount of the image-plane AF area overlapping with the region detected as the face is decided.

The processes in the second embodiment are performed as described above. In the second embodiment, since focus control is performed based on the defocusing amount of the AF area overlapping with the region detected as the face of the subject, focus control is possible based on the face positions as shown in FIGS. 18 to 19.

The processes in the present technology are performed as described above. In general, when a subject leaves all AF areas of the dedicated AF sensor 1020 in a state in which the subject has been focused and traced, there are cases in which another subject present in the background of the subject targeted by a user is focused on. However, according to the present technology, since a subject can be detected by the image-plane AF sensor 1031 in a wide range, focus can be kept on the subject once the subject is focused even when the subject leaves all AF areas of the image-plane AF sensor 1031, and erroneous focusing on another subject can be prevented.

In addition, when a tracing operation is performed with the focus on a subject who a user desires and another subject approaches and enters the frame, there are cases in which the latter subject is focused on. However, according to the present technology, once focus is on a subject, the focus is not shifted to another subject even when the subject approaches, and the focus can be continuously on the subject who the user desires.

In addition, since the image-plane AF sensor 1031 having a wide focus range is used in addition to the dedicated AF sensor 1020, even when a position of a subject is significantly changed, the subject can be reliably detected and traced. Furthermore, when the face or the like of a subject is detected, and the face or the like overlaps with image-plane AF areas, focus control is performed using image-plane defocusing amounts thereof, and thus a subject can be traced in a more extensive range than before.

<3. Modified Example>

Hereinabove, although the embodiments of the present technology have been described in detail, the present technology is not limited to the embodiments described above, and can be variously modified based on the technical gist thereof.

Additionally, the present technology may also be configured as below.

(1) An imaging apparatus including:
a first focus detection unit that has a plurality of first focus detection areas in a photographed screen, and detects a first defocusing amount in the first focus detection areas;
a second focus detection unit that has a plurality of second focus detection areas in a photographed screen, and detects a second defocusing amount in the second focus detection areas;
a defocusing amount selection unit that selects which of the first defocusing amount detected by the first focus detection unit and the second defocusing amount detected by the second focus detection unit is used; and
a focus control unit that performs focus control by moving a focus lens on the basis of the defocusing amount selected by the defocusing amount selection unit.

(2) The imaging apparatus according to (1),
wherein, when a subject overlaps with the first focus detection areas and the second focus detection areas, the defocusing amount selection unit selects the first defocusing amount.

(3) The imaging apparatus according to (1) or (2),
wherein, when the imaging apparatus is in a proximity priority mode, the defocusing amount selection unit selects the first defocusing amount.

(4) The imaging apparatus according to any one of (1) to (3), further including:
a defocusing amount decision unit that decides the second defocusing amount corresponding to each of the plurality of second focus detection areas.

(5) The imaging apparatus according to (4),
wherein, when the second focus detection unit detects the second defocusing amount, the defocusing amount decision unit compares the second defocusing amount that has been previously decided with a threshold value, and when the second defocusing amount that has been previously decided is smaller than or equal to the threshold value, the defocusing amount decision unit decides the second defocusing amount that has been previously decided as a second defocusing amount.

(6) The imaging apparatus according to any one of (1) to (5),
wherein, when the second focus detection unit detects the first defocusing amount, the defocusing amount decision unit compares the second defocusing amount that has been previously decided with a threshold value, and when the second defocusing amount that has been previously decided is greater than or equal to the threshold value, the defocusing amount decision unit decides, as the second defocusing amount, a smallest value in defocusing amount in a peripheral area of the second focus detection areas corresponding to the detected second defocusing amount.

(7) The imaging apparatus according to any one of (1) to (6), further including:
a defocusing amount correction unit that corrects the second defocusing amount detected by the second focus detection unit.

(8) The imaging apparatus according to any one of (1) to (7),
wherein, when the subject overlaps with the first focus detection areas and the second focus detection areas, the defocusing amount correction unit computes a difference between the first defocusing amount and the second defocusing amount, and thereafter, when the subject overlaps with only the second focus detection areas, the defocusing amount correction unit uses the difference to correct the second defocusing amount.

(9) The imaging apparatus according to any one of (1) to (8), further including:
a subject detection unit that detects a subject from a photographed image,
wherein, when the first focus areas overlap with a region detected by the subject detection unit as a subject, the defocusing amount selection unit selects the first defocusing amount.

(10) The imaging apparatus according to any one of (1) to (9),
wherein, when not the first focus areas but the second focus areas overlap with a region detected by the subject detection unit as a subject, the defocusing amount selection unit selects the second defocusing amount.

(11) The imaging apparatus according to any one of (1) to (10),
wherein the first focus detection unit is a dedicated phase difference focus detecting module.

(12) The imaging apparatus according to any one of (1) to (11),
wherein the second focus detection unit is a phase difference focus detecting element provided in an image sensor.

(13) The imaging apparatus according to any one of (1) to (12),
wherein positions of the second focus detection areas are unevenly disposed in the photographed screen in a manner that the first focus detection areas are associated therewith.

(14) The imaging apparatus according to any one of (1) to (13),
wherein, when the first focus detection unit fails in detecting the first defocusing amount and the second focus detection unit fails in detecting the second defocusing amount, the imaging apparatus nullifies a photographing operation.

(15) A focus control method including:
selecting which of a first defocusing amount and a second defocusing amount is used, the first defocusing amount being detected by a first focus detection unit that has a plurality of first focus detection areas in a photographed screen, the second defocusing amount being detected by a second focus detection unit that has a plurality of second focus detection areas in a photographed screen; and
performing focus control by moving a focus lens on the basis of the selected defocusing amount.

REFERENCE SIGNS LIST 1000 imaging apparatus
1020 dedicated AF sensor
1031 image-plane AF sensor
1072 defocusing amount selection unit
1073 defocusing amount decision unit
1074 defocusing amount correction unit
1075 focus control unit
1076 subject detection unit

The invention claimed is:

1. An imaging apparatus, comprising:
a first focus detection sensor that has a plurality of first focus detection areas in a photographed screen, and configured to detect a first defocusing amount in the plurality of first focus detection areas;
a second focus detection sensor that has a plurality of second focus detection areas in the photographed screen, and configured to detect a second defocusing amount in the plurality of second focus detection areas; and
one or more circuits configured to:
set a second defocusing amount that has been previously decided as the second defocusing amount based on a comparison of the previously decided second defocusing amount with a threshold value;
select which of the first defocusing amount or the second defocusing amount is used; and
control focus by movement of a focus lens based on the selected defocusing amount.

2. The imaging apparatus according to claim 1, wherein, when a subject overlaps with the plurality of first focus detection areas and the plurality of second focus detection areas, the one or more circuits are further configured to select the first defocusing amount.

3. The imaging apparatus according to claim 1, wherein, when the imaging apparatus is in a proximity priority mode, the one or more circuits are further configured to select the first defocusing amount.

4. The imaging apparatus according to claim 1, wherein one or more circuits are further configured to decide the second defocusing amount that corresponds to each of the plurality of second focus detection areas.

5. The imaging apparatus according to claim 1,
wherein, when the second focus detection sensor detects the second defocusing amount, the one or more circuits are further configured to compare the previously decided second defocusing amount with the threshold value, and
when the previously decided second defocusing amount is smaller than or equal to the threshold value, the one or more circuits are further configured to set the previously decided second defocusing amount as the second defocusing amount.

6. The imaging apparatus according to claim 1,
wherein, when the second focus detection sensor detects the second defocusing amount, the one or more circuits are further configured to compare the previously decided second defocusing amount with the threshold value, and
when the previously decided second defocusing amount is greater than or equal to the threshold value, the one or more circuits are further configured to set, as the second defocusing amount, a smallest value in defocusing amount in a peripheral area of the plurality of second focus detection areas that corresponds to the detected second defocusing amount.

7. The imaging apparatus according to claim 1, wherein the one or more circuits are further configured to:
correct the detected second defocusing amount.

8. The imaging apparatus according to claim 7,
wherein, when a subject overlaps with the plurality of first focus detection areas and the plurality of second focus detection areas, the one or more circuits are further configured to compute a difference between the first defocusing amount and the second defocusing amount, and when the subject overlaps with the plurality of second focus detection areas, the one or more circuits are further configured to use the difference to correct the second defocusing amount.

9. The imaging apparatus according to claim 1, wherein the one or more circuits are further configured to:
a subject from a photographed image; and
when the plurality of first focus detection areas overlap with a region detected as the subject, select the first defocusing amount.

10. The imaging apparatus according to claim 9, wherein, when the plurality of second focus detection areas overlap with the region detected as the subject, the one or more circuits are further configured to select the second defocusing amount.

11. The imaging apparatus according to claim 1, wherein the first focus detection sensor is a dedicated phase difference focus detecting module.

12. The imaging apparatus according to claim 1, wherein the second focus detection sensor is a phase difference focus detecting element provided in an image sensor.

13. The imaging apparatus according to claim 1, wherein positions of the plurality of second focus detection areas are unevenly disposed in the photographed screen in a manner that the plurality of first focus detection areas are associated therewith.

14. The imaging apparatus according to claim 1,
wherein, when the first focus detection sensor fails in detection of the first defocusing amount and the second focus detection sensor fails in detection of the second defocusing amount, the imaging apparatus is configured to nullify a photographing operation.

15. A focus control method, comprising:
selecting which of a first defocusing amount and a second defocusing amount is used, wherein the first defocusing amount is detected by a first focus detection sensor that has a plurality of first focus detection areas in a photographed screen, and the second defocusing amount is detected by a second focus detection sensor that has a plurality of second focus detection areas in the photographed screen;
wherein a previously set second defocusing amount is decided as the second defocusing amount based on a comparison of the previously decided second defocusing amount with a threshold value; and
controlling focus by movement of a focus lens based on the selected defocusing amount.

16. An imaging apparatus, comprising:
a first focus detection sensor that has a plurality of first focus detection areas in a photographed screen, and configured to detect a first defocusing amount in the plurality of first focus detection areas;
a second focus detection sensor that has a plurality of second focus detection areas in the photographed screen, and configured to detect a second defocusing amount in the plurality of second focus detection areas; and
one or more circuits configured to:
correct the detected second defocusing amount, wherein
when a subject overlaps with the plurality of first focus detection areas and the plurality of second focus detection areas, the one or more circuits are further configured to compute a difference between the first defocusing amount and the second defocusing amount, and when the subject overlaps with only the plurality of second focus detection areas, the one or more circuits are further configured to use the difference to correct the second defocusing amount;

select which one of the first defocusing amount or the second defocusing amount is used; and control focus by movement of a focus lens based on the selected defocusing amount.

* * * * *